(12) United States Patent
Im

(10) Patent No.: US 10,275,149 B2
(45) Date of Patent: Apr. 30, 2019

(54) ELECTRONIC DEVICE AND METHOD FOR PROCESSING TEXT INPUT IN ELECTRONIC DEVICE

(71) Applicant: Samsung Electronics Co., Ltd., Gyeonggi-do (KR)

(72) Inventor: Byung-Jai Im, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 423 days.

(21) Appl. No.: 14/965,499

(22) Filed: Dec. 10, 2015

(65) Prior Publication Data

US 2016/0188199 A1   Jun. 30, 2016

(30) Foreign Application Priority Data

Dec. 24, 2014  (KR) .......... 10-2014-0188092

(51) Int. Cl.
*G06F 3/048* (2013.01)
*G06F 3/0488* (2013.01)
*G06F 3/0481* (2013.01)
*G06F 3/023* (2006.01)

(52) U.S. Cl.
CPC ........ *G06F 3/04883* (2013.01); *G06F 3/0233* (2013.01); *G06F 3/04812* (2013.01); *G06F 2203/04808* (2013.01)

(58) Field of Classification Search
CPC ......... G06F 3/017; G06F 3/016; G06F 3/0233
See application file for complete search history.

(56) References Cited

U.S. PATENT DOCUMENTS

| 2010/0293460 | A1* | 11/2010 | Budelli | G06F 3/04842 715/702 |
| 2012/0212420 | A1* | 8/2012 | Shin | G06F 3/04883 345/173 |
| 2012/0268389 | A1* | 10/2012 | Yaron | G06F 3/0233 345/173 |
| 2012/0280916 | A1* | 11/2012 | Xia | G06F 3/0334 345/173 |
| 2012/0293427 | A1* | 11/2012 | Mukai | G06F 3/04883 345/173 |
| 2013/0113714 | A1* | 5/2013 | Mao | G06F 3/0234 345/173 |

FOREIGN PATENT DOCUMENTS

KR   20000049347   8/2000

* cited by examiner

*Primary Examiner* — Claudia Dragoescu
(74) *Attorney, Agent, or Firm* — The Farrell Law Firm, P.C.

(57) ABSTRACT

Disclosed are an electronic device and a method for controlling a text input in an electronic device. The method includes detecting at least one touch input, determining a total number of touches that have made the touch input from the detected touch input, and controlling functions related to a text input, based on the determination.

18 Claims, 20 Drawing Sheets

ELECTRONIC DEVICE AND METHOD FOR PROCESSING TEXT INPUT IN ELECTRONIC DEVICE

PRIORITY

This application claims priority under 35 U.S.C. § 119(a) to Korean Application Serial No. 10-2014-0188092, which was filed in the Korean Intellectual Property Office on Dec. 24, 2014, the contents of which are incorporated herein by reference.

BACKGROUND OF THE INVENTION

1. Field of the Invention

The present invention relates generally to an electronic device, and more particularly, to a method for processing a text input in the electronic device.

2. Description of the Related Art

Various electronic devices implementing various functions through the use of a display device have recently been developed. For example, a touch screen display unit that responds to touches has been provided on the front side of recent smart phones.

In addition, various applications, also referred to as "Apps", have been installed and executed in many electronic devices. Various input means such as the touch screen, buttons, a mouse, keyboard, and sensor may be used to execute and control the applications in the electronic device.

Text input is widely used in the electronic device for such services as message, social networking, chatting, or search services.

However, since it is always desired to maintain as small a size as possible for the electronic devices, it is difficult for the electronic device to adopt keys for text input. Accordingly, there is a need in the art for methods allowing the user to more easily input text in small electronic devices.

SUMMARY OF THE INVENTION

The present invention has been made to address the above mentioned problems and disadvantages, and to provide at least the advantages described below. Accordingly, an aspect of the present invention is to provide a simplified method and apparatus for text input in an electronic device.

Another aspect of the present invention is to provide an electronic device and a method for processing a text input whereby a user can easily input text even in a small electronic device.

In accordance with an aspect of the present invention, a method for controlling text input in an electronic device includes detecting at least one touch input, determining a total number of touches that have made the touch input from the detected touch input, and controlling functions related to a text input, based on the determination.

In accordance with an aspect of the present invention, an electronic device includes a touch screen, and a processor that determines a total number of touches that have made a touch input detected through the touch screen, and controls functions related to a text input, based on the determination.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE INVENTION

Figure 1:
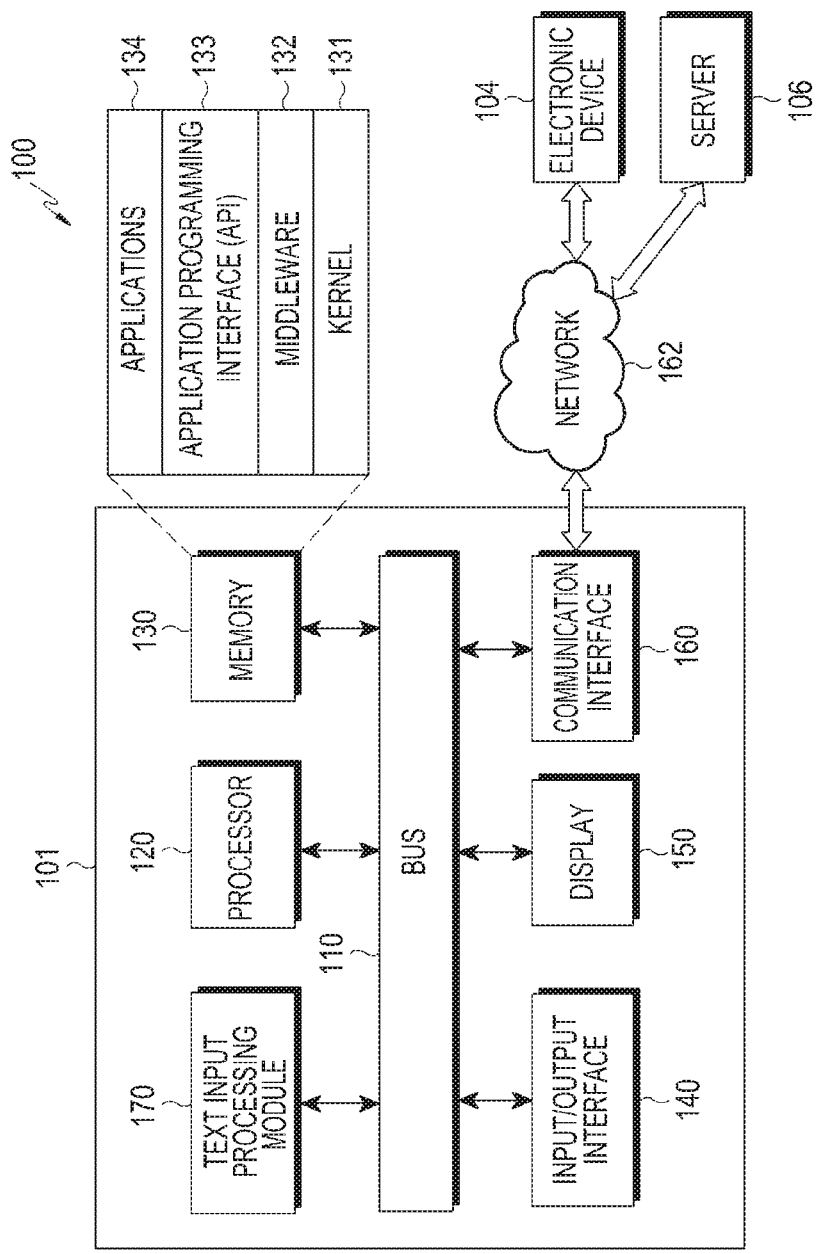
FIG. 1 is a block diagram of an electronic device according to an embodiment of the present invention.

The present invention will be described with reference to the accompanying drawings. In the drawings, the same or similar elements are denoted by the same reference numerals even though they are depicted in different drawings. In the following description, a detailed description of known functions and configurations incorporated herein will be omitted for the sake of clarity and conciseness.

In the present disclosure, the expressions "have", "may have", "include" and "includes" refer to the existence of a corresponding feature (e.g., numerical value, function, operation, or components such as elements), and do not exclude the existence of additional features.

In the present disclosure, the expressions "A or B", "at least one of A or/and B", and "one or more of A or/and B" include all possible combinations of items listed. For example, the expressions "A or B", "at least one of A and B", and "at least one of A or B" refer to all of (1) including at least one A, (2) including at least one B, and (3) including all of at least one A and at least one B.

The expressions "a first", "a second", "the first", and "the second" used in various embodiments of the present invention may modify various components regardless of the order and/or the importance but do not limit the corresponding components. The expressions may be used to distinguish a component element from another component element. For example, a first user device and a second user device may indicate different user devices regardless of the sequence or importance thereof. For example, a first element may be referred to as a second element, and similarly, a second element may be referred to as a first element without departing from the scope of the present invention.

When it is disclosed that one element (e.g., a first element) is "(operatively or communicatively) coupled with/to or connected to" another element (e.g., a second element), it should be construed that the one element is directly connected to the another element or the one element is indirectly connected to the another element via yet another element (e.g., a third element). Conversely, when it is disclosed that one element (e.g., a first element) is "directly coupled" or "directly connected" to another element (e.g., a second element), it may be construed that yet another element does not exist between the one element and the another element.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may indicate that the device, together with other devices or components, "is able to". For example, the phrase "processor adapted (or configured) to perform A, B, and C" may mean a dedicated processor (e.g. embedded processor) only for performing the corresponding operations, a generic-purpose processor (e.g., Central Processing Unit (CPU) or Application Processor (AP)) that can perform the corresponding operations by executing one or more software programs stored in a memory device.

The terms used in the present disclosure are only used to describe specific embodiments, and are not intended to limit the present invention. As used herein, the singular forms include the plural forms as well, unless the context clearly indicates otherwise. Unless defined otherwise, all terms used herein, including technical and scientific terms, have the same meaning as those commonly understood by a person skilled in the art to which the present invention pertains. Such terms as those defined in a generally used dictionary are to be interpreted to have the meanings equal to the contextual meanings in the relevant field of the art, and are not to be interpreted to have ideal or excessively formal meanings unless clearly defined in the present disclosure. In some cases, even the term defined in the present disclosure should not be interpreted to exclude embodiments of the present invention.

For example, the electronic device includes at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), an MP3 player, a mobile medical appliance, a camera, and a wearable device (e.g., a Head-Mounted-Device (HMD) such as electronic glasses, electronic clothes, an electronic bracelet, an electronic necklace, an electronic appcessory, electronic tattoos, or a smart watch).

According to some embodiments, the electronic device may be a smart home appliance, such as a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to another embodiment, the electronic device includes at least one of various medical devices (e.g., various portable medical measuring devices (a blood glucose monitoring device, a heart rate monitoring device, a blood pressure measuring device, and a body temperature measuring device), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or Internet device of things (e.g., a light bulb, various sensors, electric or gas meter, a sprinkler device, a fire alarm, a thermostat, a streetlamp, a toaster, a sporting goods, a hot water tank, a heater, and a boiler).

According to some embodiments, the electronic device includes at least one of a part of furniture or a building/structure, an electronic board, an electronic signature receiving device, a projector, and various types of measuring instruments (e.g., a water meter, an electric meter, a gas meter, and a radio wave meter).

The electronic device according to an embodiment of the present invention may be a combination of one or more of the aforementioned various devices, and may be a flexible device. The electronic device is not limited to the aforementioned devices, and also includes a new electronic device according to the development of technology.

In the present disclosure, the term "user" may indicate a person using an electronic device or a device (e.g. an artificial intelligence electronic device) using an electronic device.

FIG. 1 is a block diagram of an electronic device according to an embodiment of the present invention. Referring to FIG. 1, the network environment 100 includes at least one electronic device (e.g., electronic device 101 or 104) and a server 106.

The electronic device 101 includes a bus 110, a processor 120, a memory 130, an input/output interface 140, a display 150, a communication interface 160, and a text input processing module 170.

The bus 110 may be a circuit to connect the above-described elements with each other and to transfer communication (e.g., control messages) between the above-described elements.

The processor 120 receives instructions from the above-described elements (e.g., the memory 130, the input/output interface 140, the display 150, the communication interface 160, or the text input processing module 170) through, for example, the bus 110, decodes the received instructions, and performs calculation or data processing according to the decoded instructions.

The memory 130 stores instructions or data received from the processor 120 or other elements (e.g., the input/output interface 140, the display 150, the communication interface 160, or the text input processing module 170) or generated by the processor 120 or other elements. The memory 130 includes programming modules such as, for example, a kernel 131, a middleware 132, an Application Programming Interface (API) 133, or applications 134. Each of the programming modules mentioned above may be configured with software, firmware, hardware, or a combination thereof.

The kernel 131 controls or manages system resources (e.g., the bus 110, the processor 120, and the memory 130) which are used in performing operations or functions implemented by other programming modules, such as the middleware 132, the API 133 or the applications 134. The kernel 131 provides interfaces by which the middleware 132, the API 133 or the applications 134 may access each element of the electronic device 101 for control or management.

The middleware 132 plays the intermediate role between the API 133 or the applications 134 and the kernel 131 to communicate with each other for transmission and reception of data. In relation to requests for operation received from the applications 134, the middleware 132 controls (e.g., scheduling or load-balancing) the requests by, for example, determining priority for using system resources (e.g., the bus 110, the processor 120, the memory 130) of the electronic device 101 with respect to at least one of the applications 134.

The API 133 is an interface by which the applications 134 control functions provided from the kernel 131 or the middleware 132, and includes, for example, at least one interface or function (e.g., instructions) for file control, window control, image processing, or text control.

According to an embodiment, the applications 134 include one or more of a text input function, an SMS/MMS application, an e-mail application, a calendar application, an alarm application, a health care application (e.g., an application for measuring the amount of exercise or blood sugar), and an environmental information application (e.g., an application for providing atmospheric pressure, humidity, or temperature). The applications 134 may also include the exchange of information between the electronic device 101 and external electronic devices (e.g., electronic device 104). The information-exchange-related application includes, for example, a notification relay application for relaying specific information to the external electronic device, or a device management application for managing the external electronic device.

For example, the notification relay application includes a function of transferring notification information generated in other applications (e.g., the SMS/MMS application, the e-mail application, the health care application, or the environmental information application) of the electronic device 101 to an external electronic device (e.g., the electronic device 104). Additionally or alternatively, the notification relay application receives notification information from the external electronic device 104 and provides the same to a user. The device management application manages (e.g., install, delete, or update), for example, at least some functions (e.g., turning the external electronic device (or some elements thereof) on or off, or adjusts the brightness (or resolution) of a display) of the external electronic device 104 that communicates with the electronic device 101, applications performed in the external electronic device, or services (e.g., phone call service, or messaging service) provided in the external electronic device.

According to an embodiment, the applications 134 include applications, which are designated according to the properties (e.g., the type of electronic device) of the external electronic device 104. For example, if the external electronic device is an MP3 player, the applications 134 include applications related to reproduction of music. Likewise, if the external electronic device is a mobile medical device, the applications 134 include an application related to health care. According to an embodiment, the applications 134 include at least one application designated in the electronic device 101 or applications received from external electronic devices (e.g., server 106 or electronic device 104).

The input/output interface 140 transfers instructions or data input by a user through input/output devices (e.g., sensors, keyboards, or touch screens) to the processor 120, the memory 130, the communication interface 160, or the text input processing module 170 through, for example, the bus 110. For example, the input/output interface 140 provides data on a user's touch input through a touch screen to the processor 120. For example, instructions or data received from the processor 120, the memory 130, the communication interface 160, or the text input processing module 170 through the bus 110 is output through the input/output devices (e.g., speakers or displays). For example, the input/output interface 140 outputs voice data processed by the processor 120 to a user through a speaker.

The display 150 displays various pieces of information (e.g., multimedia data or text data) to a user.

According to an embodiment of the present invention, the display 150 includes sensors that detect gestures. The gestures include, but are not limited to touching, tapping, double tapping, flicking, dragging, dragging and dropping, swiping, multi-swiping, pinching, touching and holding, shaking, and rotating. Any sensor capable of detecting the gestures may be adopted.

Touches according to an embodiment of the present invention, may be input using at least one finger. For example, the touches may be input through a single touch area or a multi-touch (e.g., double or triple) area according to the number of fingers utilized.

According to an embodiment of the present invention, the number and sizes of the touch areas may be diverse to correspond to a predetermined range, and to various tools (e.g., touch pens) for touch inputs.

According to an embodiment of the present invention, a text input mode may be configured in the electronic device according to the number of fingers utilized. For example, the text input mode controls various operations related to a text input such as inputting text, deleting text, or moving a cursor, according to the number of touching fingers.

The communication interface 160 connects communications between the electronic device 101 and external electronic devices (e.g., electronic device 104, or server 106). For example, the communication interface 160 may be connected with a network 162 through wireless communication or wired communication to communicate with the external electronic device. The wireless communication includes at least one scheme of Wi-Fi, Bluetooth™ (BT), Near Field Communication (NFC), a Global Positioning System (GPS), or cellular communication (e.g., Long Term Evolution (LTE), LTE-A, Code Division Multiple Access (CDMA), Wideband CDMA (WCDMA), Universal Mobile Telecommunications System (UMTS), WiBro, or GSM). The wired communication includes at least one of a Universal Serial Bus (USB), a High Definition Multimedia Interface (HDMI), recommended standard 232 (RS-232), or a Plain Old Telephone Service (POTS).

The network 162 may be a telecommunication network including at least one of a computer network, the Internet, the Internet of things, or a telephone network. Protocols such as transport layer protocol, data link layer protocol, or physical layer protocol, for communication between the electronic device 101 and external electronic devices may be supported by at least one of the applications 134, the API 133, the middleware 132, the kernel 131, or the communication interface 160.

The text input processing module 170 processes at least some information obtained from other elements (e.g., the processor 120, the memory 130, the input/output interface 140, or the communication interface 160), and provides the processed information to a user in various manners. For example, the text input processing module 170 controls at least some functions of the electronic device 101 using the processor 120 or independently so that the electronic device 101 may interwork with other electronic devices (e.g., electronic device 104 or server 106).

For example, the text input processing module 170 detects at least one touch input, and controls a text input according to the number of fingers touching the module.

According to an embodiment of the present invention, the text input control of the text input processing module 170 includes inserting a space, controlling location of a cursor, or deleting text that has already been input, when two fingers have touched the electronic device. In addition, the processor 120 controls to output text corresponding to the gesture that has been previously identified when three fingers have touched the electronic device.

According to an embodiment of the present invention, the electronic device includes a touch screen, and a processor that determines the number of fingers that have made a touch input detected through the touch screen, and controls functions related to a text input, based on the determination.

According to embodiments of the present invention, the processor performs the following operations:

The processor determines whether the touch input has been made by fingers or by a palm, based on the detected touch input. If the touch input has been made by a palm, the processor controls a function related to a text input corresponding to the touch input by the palm.

If it is determined that the touch input has been made by a single finger, the processor identifies a letter corresponding to the touch input by a single finger.

If it is determined that the touch input has been made by three fingers, the processor controls to input the identified letter corresponding to the touch input by a single finger.

According to an embodiment of the present invention, the processor determines a moving direction of the detected touch input.

If it is identified that the touch input has been made by two fingers, the processor controls the text input according to the moving direction of the touch input by two fingers.

If the touch input by two fingers moves to the left, the processor controls to move a cursor by each letter unit in a text input window according to the number of the touch inputs by two fingers.

If the touch input by two fingers moves to the right, inserts a space according to the number of the touch inputs by two fingers.

If the touch input by two fingers moves upwards, the processor deletes letters that have been previously input according to the number of the touch inputs by two fingers.

If the touch input by two fingers moves downwards, the processor controls to close a text input window.

Although the text input processing module 170 is illustrated to be separated from other elements in FIG. 1, the text input processing module 170 may be replaced by the processor 120. In this case, the text input processing module 170 may be omitted.

Figure 2:
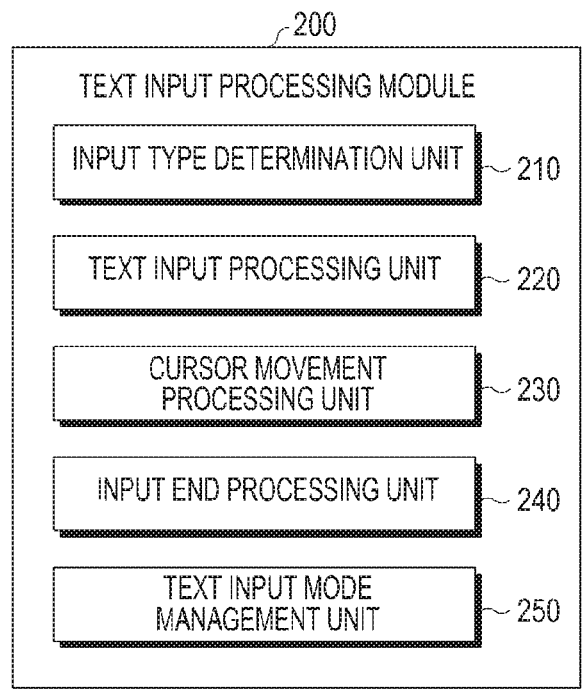
FIG. 2 is a block diagram of a text input processing module of an electronic device according to an embodiment of the present invention.

FIG. 2 is a block diagram of a text input processing module of an electronic device according to an embodiment of the present invention. Referring to FIG. 2, the text input processing module 200 includes an input type determination unit 210, a text input processing unit 220, a cursor movement processing unit 230, an input end processing unit 240, and a text input mode management unit 250.

The input type determination unit 210 determines the type of input gesture or the number of input gestures. The text input processing module 200 controls the electronic device (e.g., electronic device 101) to perform functions according to the number of fingers that input gestures.

When there is a gesture input, the text input processing unit 220 identifies the type of gesture. The identified type of gesture may be stored temporarily, and text corresponding to the type is output in the display (e.g., display 150) according to subsequently input gestures.

According to an embodiment of the present invention, if the current text input mode is in Korean, the text input processing unit 220 identifies the gestures as consonants or vowels.

If the input gesture is for moving a cursor, the cursor movement processing unit 230 controls to move the cursor in the direction corresponding to the direction of the input gesture. According to an embodiment of the present invention, if a touch input using two fingers is received, the electronic device determines the touch input to be a gesture for moving the cursor.

If an input gesture to inform that inputs of consonants or vowels are complete is received, the input end processing unit 240 controls to input a letter corresponding to a gesture that has been previously input. For example, if a touch input using three fingers is identified, the input end processing unit 240 determines that the text input has been completed.

According to an embodiment of the present invention, if a touch input using three fingers is identified, the input end processing unit 240 controls the display to display a letter (e.g., consonant or vowel in Korean, or alphabet in English) corresponding to the input gesture.

The text input mode management unit 250 configures languages with respect to the input gesture. According to an embodiment of the present invention, a text input image includes a selection item for selecting a text input mode. The text input mode may be preset as a default or may be configured by a user. Various types of languages or letters such as Korean, English, signs, or numbers, may be selected in the text input mode.

Figure 3:
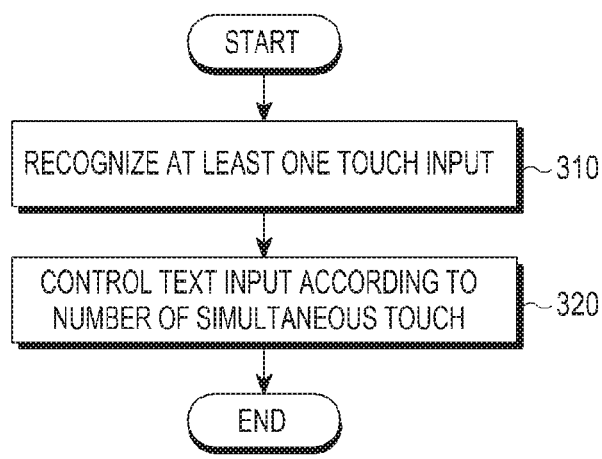
FIG. 3 is a flowchart illustrating processing a text input according to an embodiment of the present invention.

FIG. 3 is a flowchart illustrating processing a text input according to an embodiment of the present invention. Referring to FIG. 3, in step 310, the electronic device detects at least one touch input. For example, the electronic device determines whether the touch input is made by fingers or by a palm.

In step 320, the electronic device controls a text input according to the identification of the touch input by fingers or by a palm. For example, the touch input using fingers may be input through at least one touch area.

According embodiments of the present invention, text input in an electronic device is controlled in the following manners:

At least one touch input is detected, the number of fingers that have made the touch input from the detected touch input are determined, and functions related to a text input are controlled based on the determination.

It is determined whether the touch input has been made by fingers or by a palm, based on a detected touch input, and if the touch input has been made by a palm, a function related to a text input corresponding to the touch input by the palm is executed.

If it is determined that a touch input has been made by a single finger, a letter corresponding to the touch input by a single finger is identified.

If it is determined that the touch input has been made by three fingers, the identified letter corresponding to the touch input is input by a single finger.

A moving direction of the detected touch input is identified.

If it is identified that the touch input has been made by two fingers, the text input is controlled according to the moving direction of the touch input by two fingers.

If the touch input by two fingers moves to the left, a cursor is moved by each letter unit in a text input window according to the number of the touch inputs by two fingers.

If the touch input by two fingers moves to the right, a space is inserted according to the number of the touch inputs by two fingers.

If the touch input by two fingers moves upwards, letters that have been previously input are deleted according to the number of the touch inputs by two fingers.

If the touch input by two fingers moves downwards, a text input window is closed.

Figure 4:
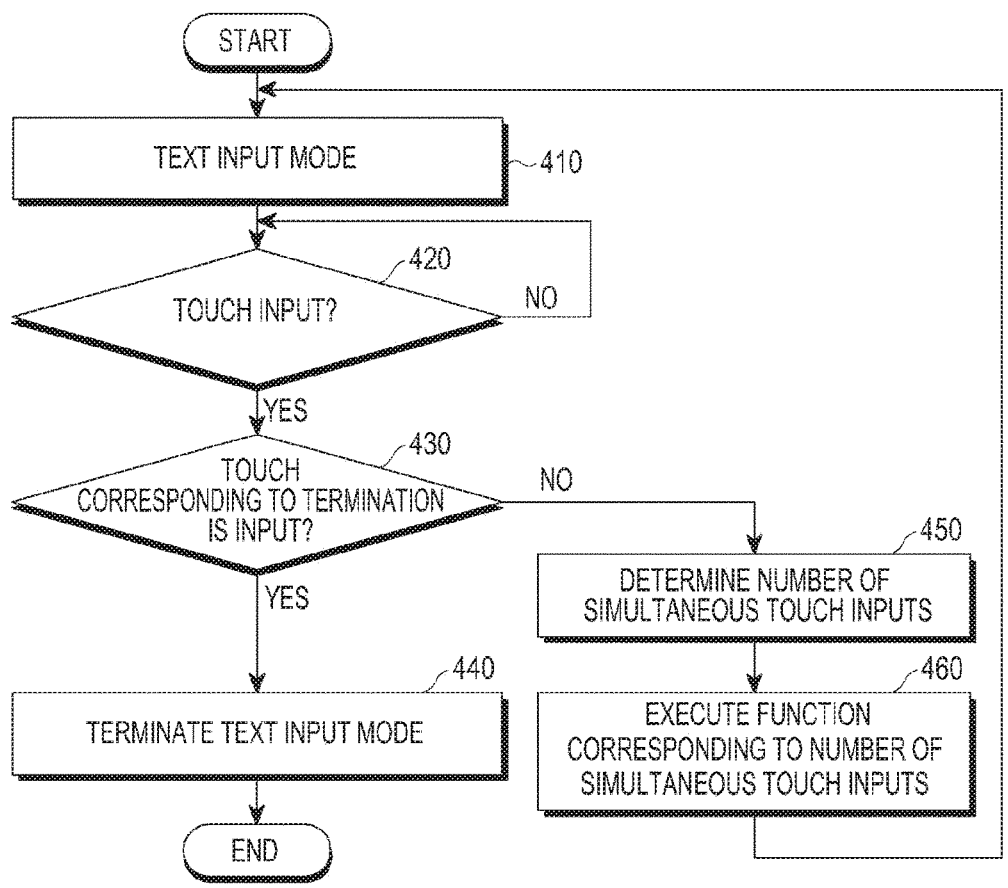
FIG. 4 is a flowchart illustrating processing a text input according to an embodiment of the present invention.

FIG. 4 is a flowchart illustrating processing a text input according to an embodiment of the present invention. Referring to FIG. 4, in step 410, the electronic device configures a text input mode. For example, as the text input mode is configured, the electronic device inputs or deletes text or controls a cursor according to the number of touching fingers.

If the touch input is made by a single finger, the electronic device configures the text input mode for inputting text corresponding to the single-finger-touch.

In step 420, the electronic device determines whether the touch input is received. If the touch input is not received, the electronic device repeats step 420.

If the touch input is received, the electronic device determines whether a touch input for termination is received in step 430.

If the touch input for termination is received, the electronic device terminates the text input mode in step 440.

If three touch inputs for termination are received, the electronic device terminates the text input corresponding to the single touch input, and waits for the next touch input.

If the touch input for termination is not received, the electronic device determines the number of simultaneous touch inputs in step 450.

In step 460, the electronic device performs a function corresponding to the number of simultaneous touch inputs.

According to an embodiment of the present invention, if the touch input using two fingers is received, the electronic device performs moving of a cursor, closing of a text input window, or deleting of the input text.

Figure 5:
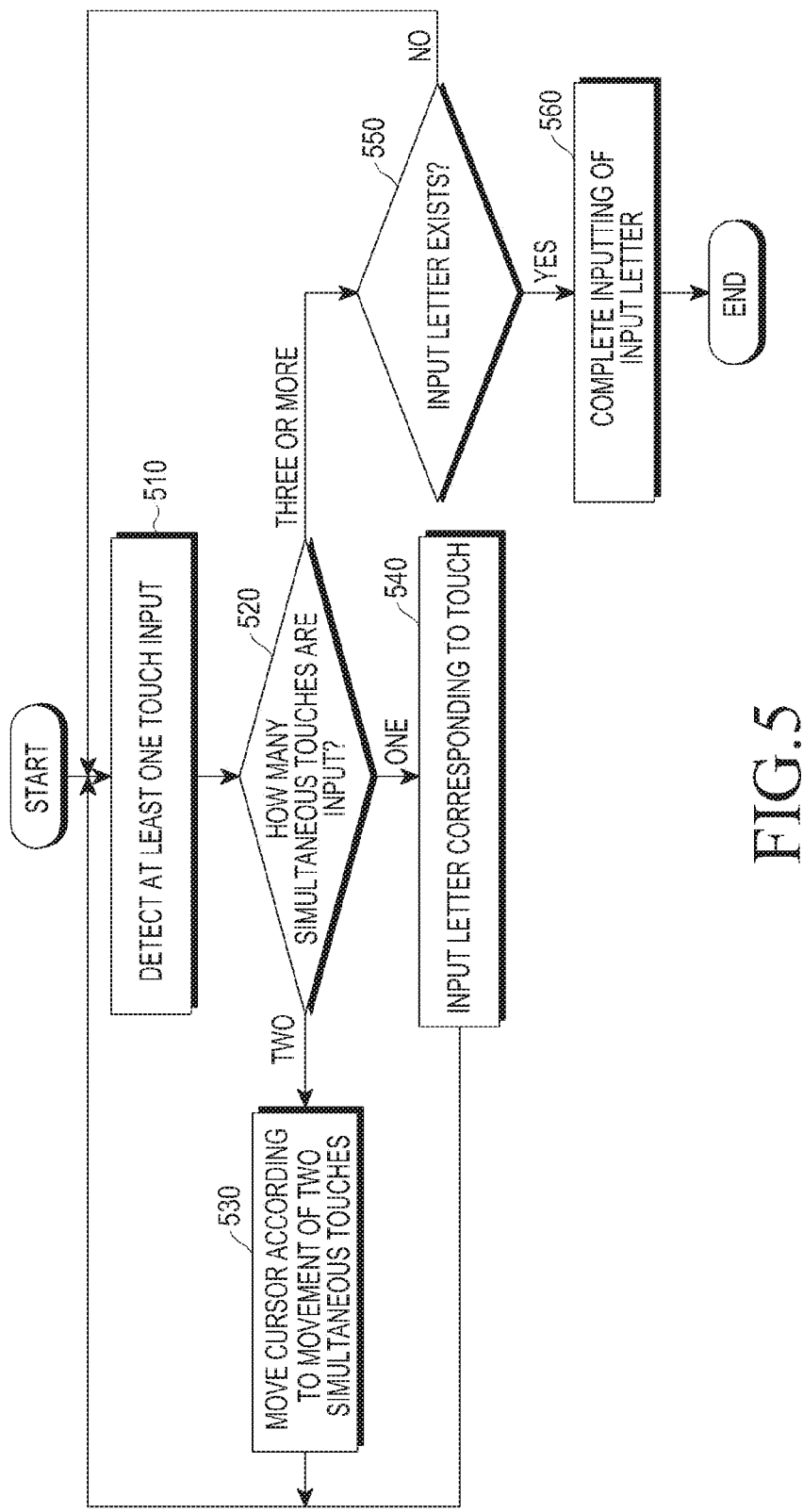
FIG. 5 is a flowchart illustrating processing a text input according to an embodiment of the present invention.

FIG. 5 is a flowchart illustrating processing a text input according to an embodiment of the present invention. Referring to FIG. 5, in step 510, the electronic device detects at least one touch input.

In step 520, the electronic device identifies the number of fingers that have made the touch input. If the touch input using two fingers has been received, the electronic device moves a cursor according to direction of the touch input by two fingers in step 530. In addition, according to an embodiment of the present invention, the electronic device moves the cursor up, down, to the left, or to the right according to direction of the touch input by two fingers, and deletes text that has been previously input or closes the text input window.

If the touch input using a single finger is received, the electronic device inputs text corresponding to the touch input in step 540. If the touch input using three fingers is received, the electronic device determines whether the text that has been previously input exists in step 550.

If the text that has been previously input does not exist, the electronic device returns to step 510. If the text that has been previously input exists, the electronic device completes the text input that has been previously input in step 560.

Figure 6:
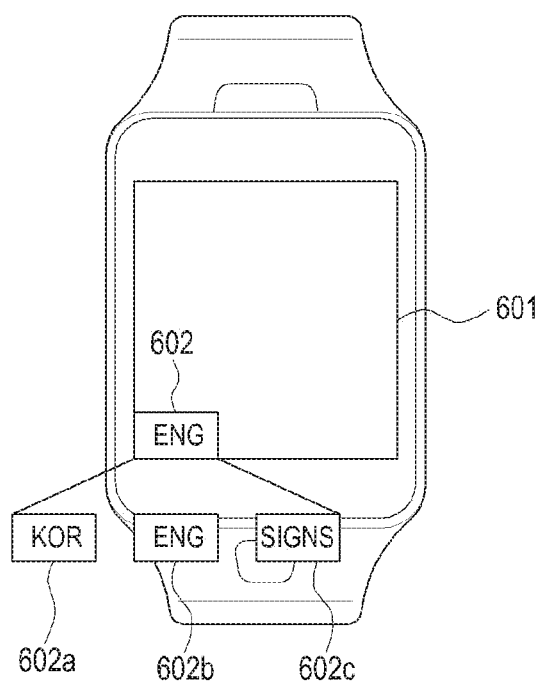
FIG. 6 illustrates a screen image in processing a text input according to an embodiment of the present invention.

FIG. 6 illustrates a screen image in processing a text input according to an embodiment of the present invention. Referring to FIG. 6, a screen image 601 on which the text input processing operation is performed, includes item 602 for selecting the type of text. For example, item 602 includes selection items for selecting Korean language 602a, English language 602b, or signs 602c.

Specifically, item 602 includes items for selecting various languages such as Korean and English, and includes items for selecting various types of letters such as numbers.

Figure 7:
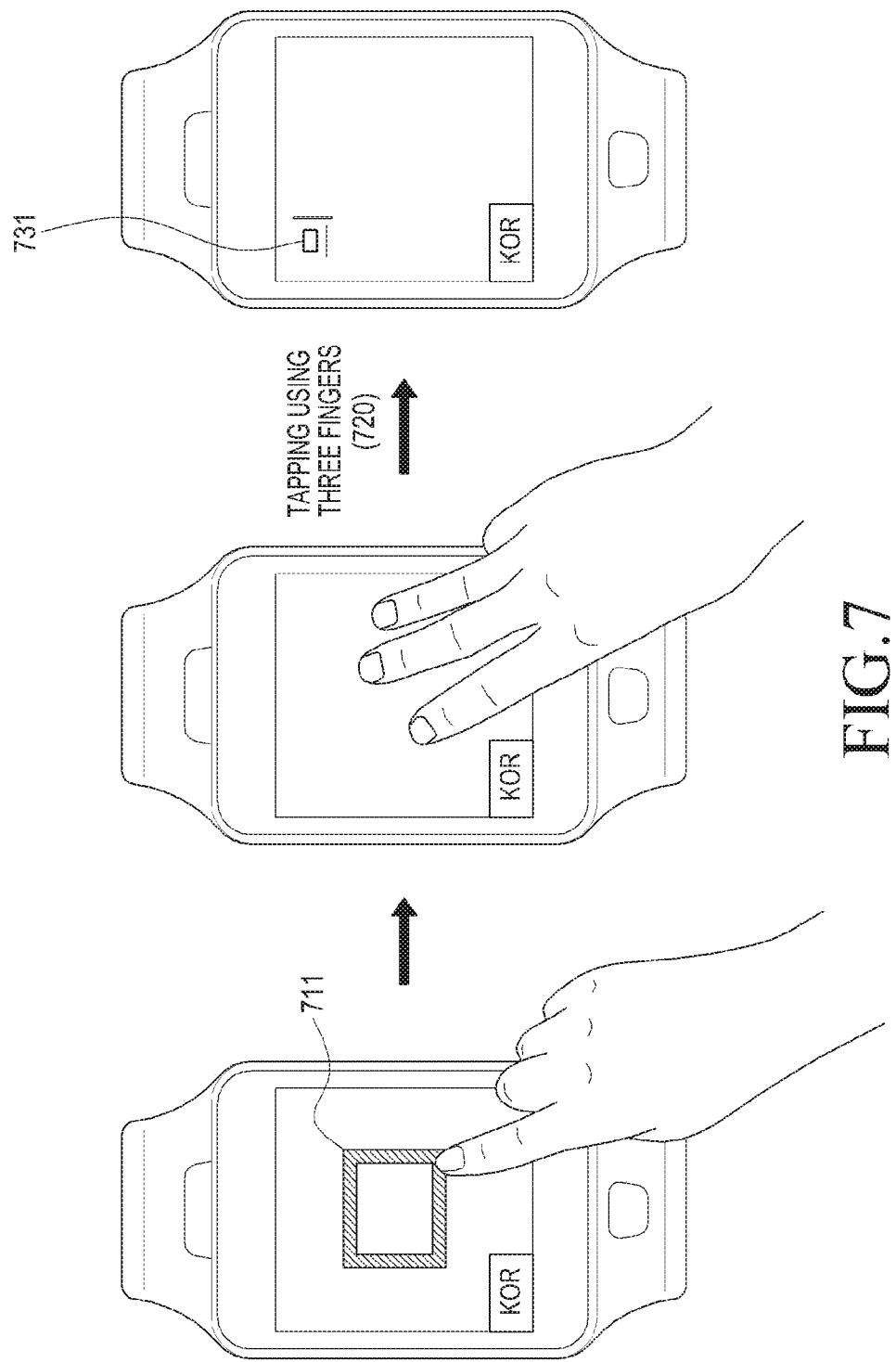
FIG. 7 illustrates processing a text input according to an embodiment of the present invention.

FIG. 7 illustrates processing a text input according to an embodiment of the present invention. Referring to FIG. 7, a user inputs letters (e.g., consonants in Korean) into the electronic device, using gestures.

The user inputs a gesture (e.g., tapping or dragging) 711 using a single finger on the touch screen of the electronic device, which identifies the single touch input, and recognizes the shape corresponding to the single touch input as a letter. For example, the electronic device recognizes the shape corresponding to the single touch input as a consonant in Korean. The user then inputs another gesture (e.g., tapping) 720 using three fingers on the touch screen.

When the tap input 720 using three fingers is received, the electronic device inputs a Korean letter, i.e., "ㅁ" 731, corresponding to the shape of the single touch input. For example, the Korean letter corresponding to "ㅁ" 731 is output through the display.

The electronic device completes the input of the letter corresponding to the shape of the single touch input when a touch input using a predetermined number of fingers is received.

Figure 8A:
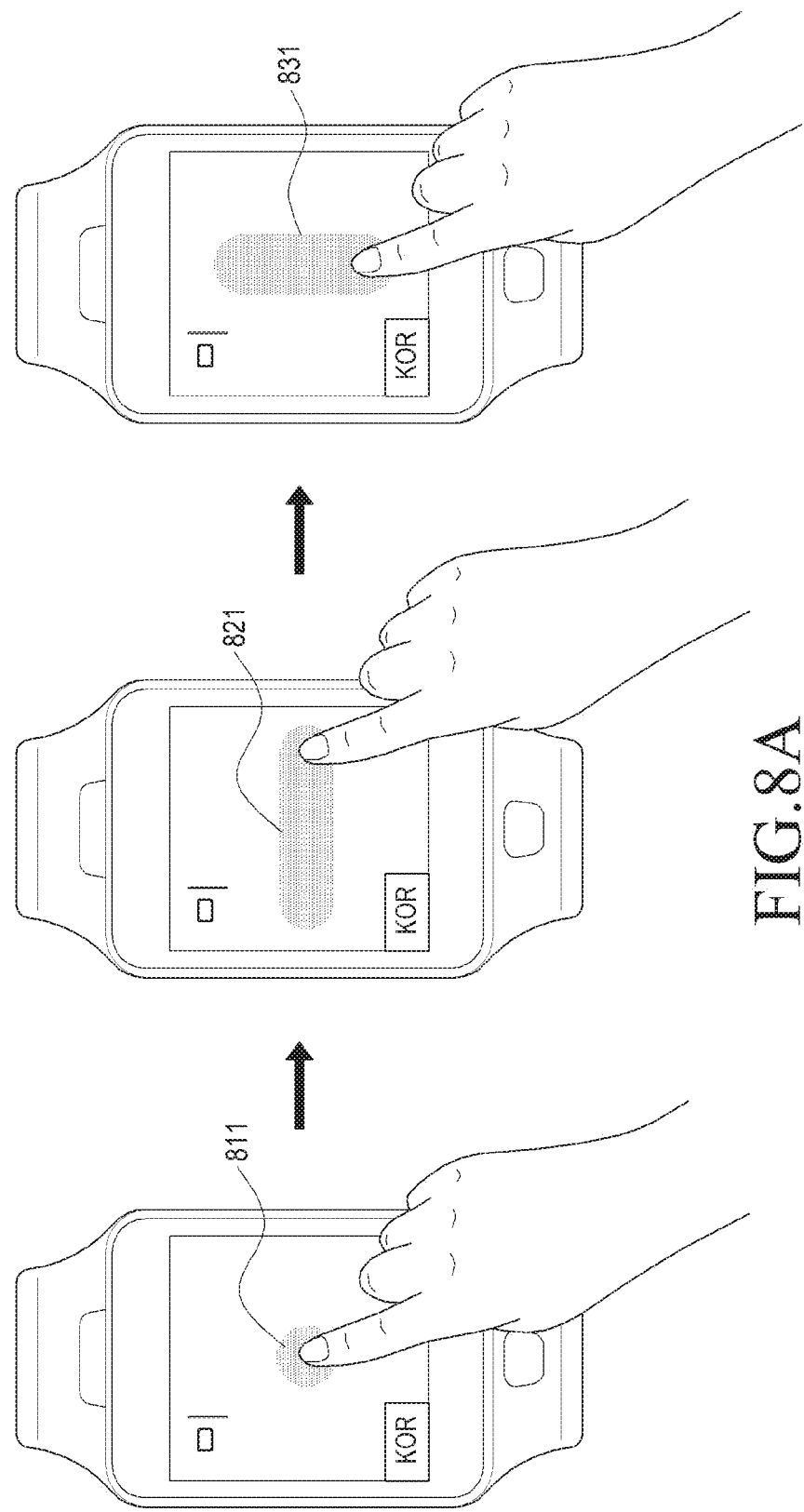
FIG. 8A illustrates processing a text input according to an embodiment of the present invention.
Figure 8B:
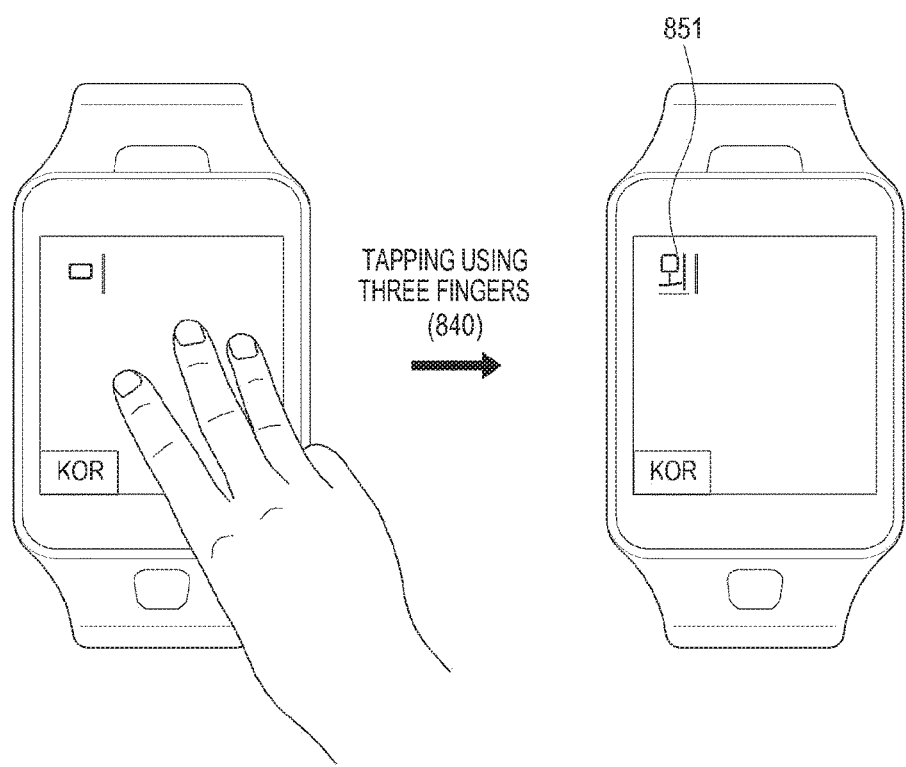
FIG. 8B illustrates processing a text input according to an embodiment of the present invention.

FIGS. 8A and 8B illustrate examples of processing a text input according to an embodiment of the present invention.

For example, the user inputs a Korean vowel after the input of the Korean consonant (e.g., "ㅁ").

Referring to FIG. 8A, the user inputs letters (e.g., vowels in Korean) into the electronic device using gestures. The user inputs a gesture (e.g., tapping or dragging) 811 using a single finger on the display (e.g., display 150) of the electronic device. The electronic device identifies the single touch input, and recognizes the shape corresponding to the single touch input as a letter.

According to an embodiment of the present invention, the electronic device recognizes the shape corresponding to the single touch input as a vowel in Korean. For example, the electronic device recognizes the input of vowels based on the typing method of Cheonjiin, which includes inputting vowels using at least one of "?," "-," and "1." Although the input of vowels is based on the typing method of Cheonjiin in the present embodiment, the electronic device recognizes vowels that are input in various manners. For example, the user inputs a gesture corresponding to the shape of "?" 811, "-" 821 and "1" 831 using a single finger to thereby input a specific vowel.

The electronic device recognizes a specific vowel according to the gesture input corresponding to the shape of "?" 811, "-" 821 and "l" 831, or the sequence of the gesture inputs. For example, the electronic device recognizes Korean vowels according to the input sequence of "?" 811, "-" 821 and "l" 831, which are input to correspond to the single touch input, and recognizes a vowel of "ᅬ" when the gestures corresponding to the shape of "?" 811, "-" 821 and "l" 831 are input in sequence.

Referring to FIG. 8B, after the user inputs a letter using a single finger, the user inputs another gesture (e.g., tap 840) using three fingers on the touch screen.

When the input 840 by three fingers is received, the electronic device inputs the vowel of "ᅬ" corresponding to the shape of the single touch input. For example, the electronic device inputs the letter (e.g., "뫼") that is a combination of the consonant (e.g., "ㅁ") and the vowel (e.g., "ᅬ"), which have been previously input, whenever the tap input 840 using three fingers is received. For example, the consonant and the vowel, which have been previously input, may be based on the typing method of Cheonjiin.

In addition, the electronic device recognizes a consonant that has been previously input. For example, the electronic device recognizes the consonant (e.g., "ㅁ") that has been previously input, and combines the previously input consonant with the vowel (e.g., "ᅬ") that is input by step 840 to thereby input the complete letter (e.g., "뫼") 851.

The electronic device completes the input of the letter corresponding to the shape of the single touch input when a touch input using a predetermined number of fingers is received.

Figure 9:
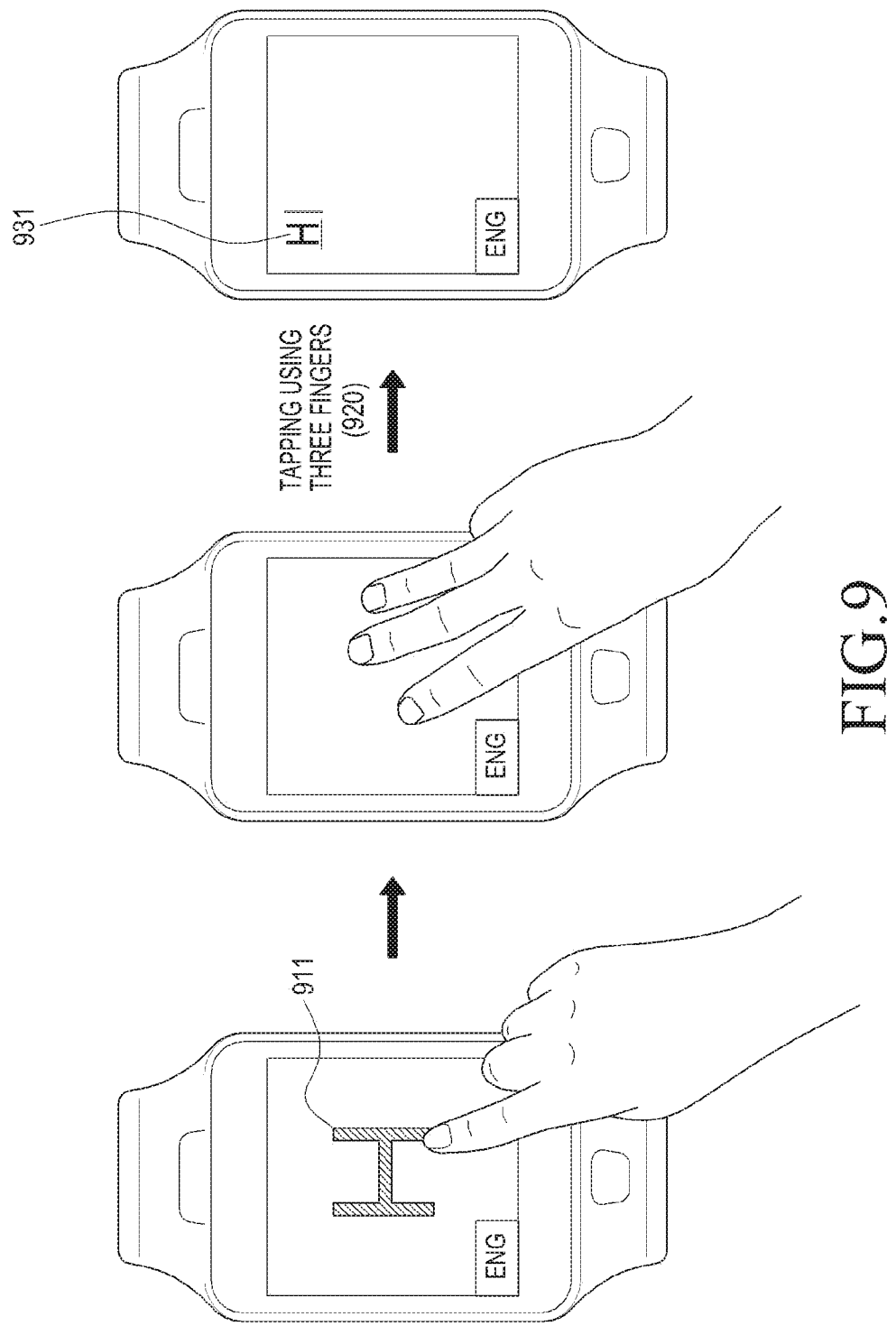
FIG. 9 illustrates processing a text input according to an embodiment of the present invention.

FIG. 9 illustrates processing a text input according to an embodiment of the present invention. Referring to FIG. 9, the user inputs letters (e.g., English alphabet) into the electronic device using gestures.

The user inputs a gesture (e.g., tapping or dragging) 911 using a single finger on the display (e.g., display 150) of the electronic device. The electronic device identifies the single touch input, and recognizes the shape corresponding to the single touch input as a letter.

In FIG. 9, the electronic device recognizes the shape corresponding to the single touch input as an English letter according to the configured text input mode. The user inputs a gesture (e.g., tap) 920 using three fingers.

When the tap input 920 using three fingers is identified, the electronic device inputs the alphabetic letter of "H" 931 corresponding to the single touch input.

The electronic device completes the input of the letter corresponding to the shape of the single touch input when a touch input using a predetermined number of fingers is identified.

Figure 10A:
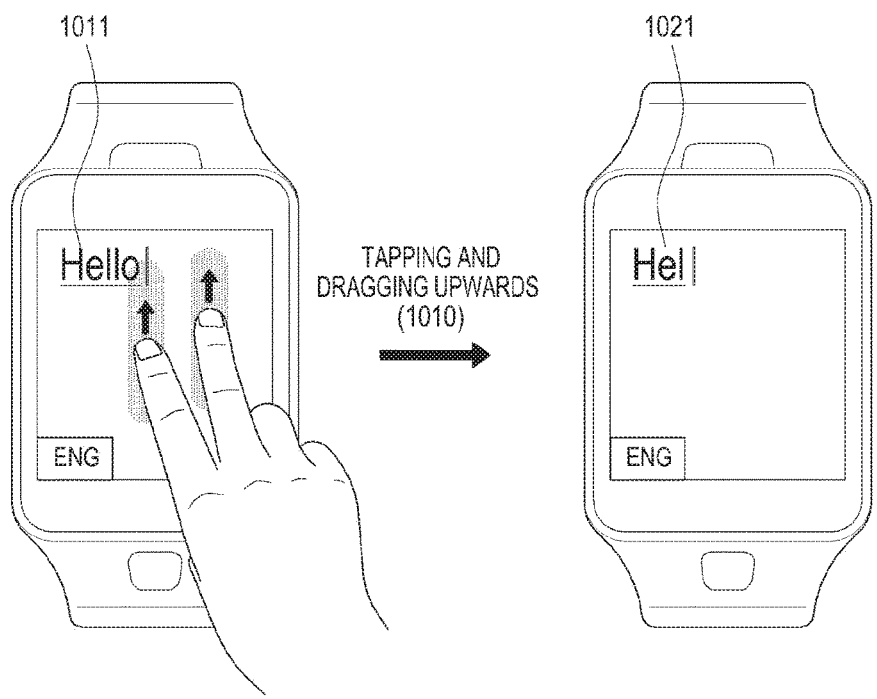
FIG. 10A illustrates processing a text input according to an embodiment of the present invention.
Figure 10B:
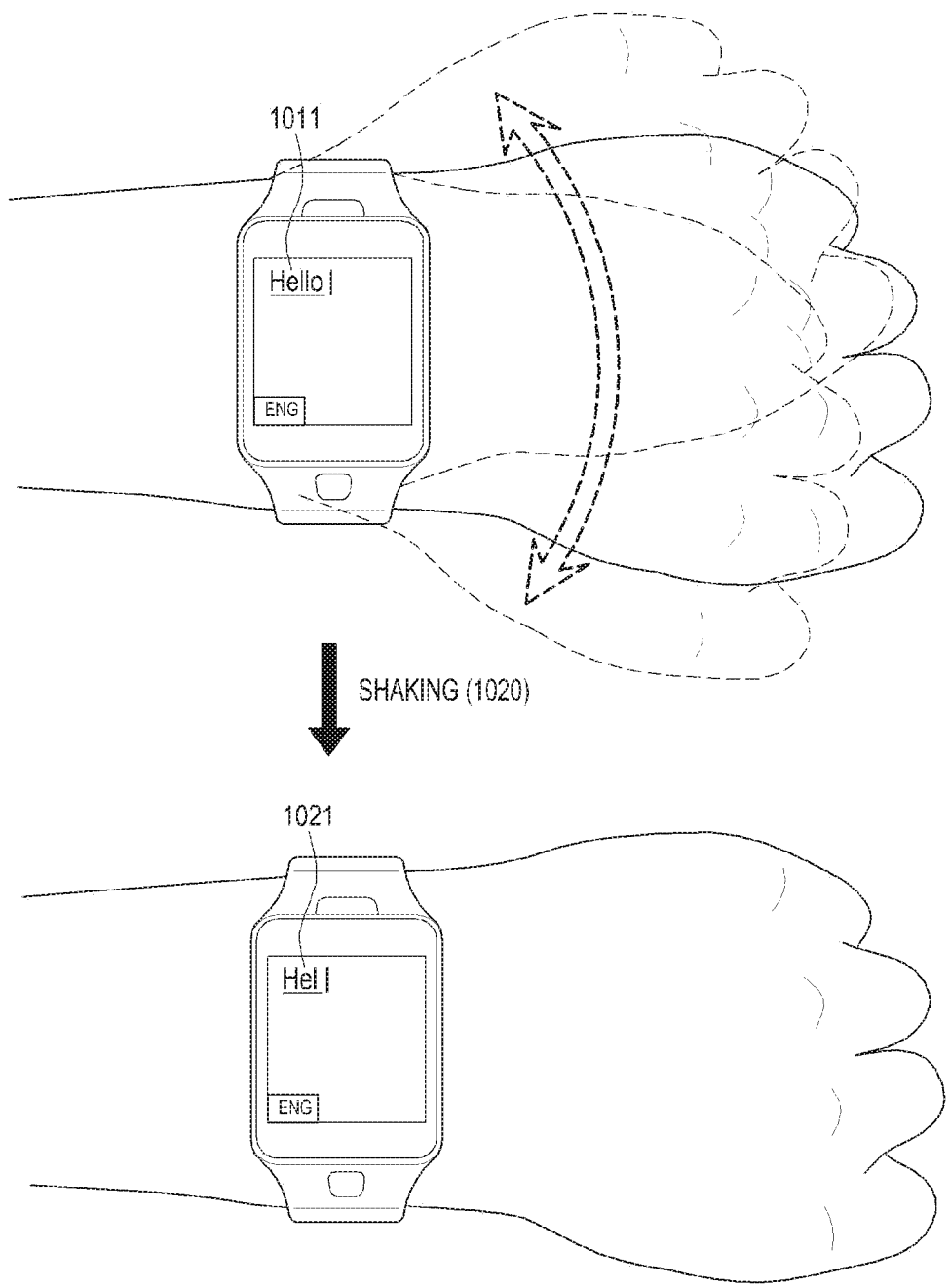
FIG. 10B illustrates processing a text input according to an embodiment of the present invention.

FIGS. 10A and 10B illustrate examples of processing a text input according to an embodiment of the present invention.

In FIG. 10A, after the input of English text (e.g., "Hello") 1011, the user deletes the input text using a predetermined gesture.

The user deletes letters to the left of a cursor based on a gesture using two fingers (e.g., tapping and dragging upwards), as shown in step 1010. For example, when the user performs tapping and dragging upwards twice in step 1010, the electronic device deletes the letters "o" and "l" to the left of the cursor.

Referring to FIG. 10B, the user performs shaking the electronic device in step 1020, during the text input.

According to an embodiment of the present invention, the electronic device deletes the letters to the left of the cursor, based on the shaking step 1020. For example, when the user performs the shaking step 1020 twice, the electronic device deletes the letters "o" and "l" to the left of the cursor.

Due to tapping and dragging upwards in step 1010 or shaking in step 1020, the letters "o" and "l" of the text "Hello" 1011 are deleted, and the text are changed into "Hel" 1021 as displayed.

Figure 11:
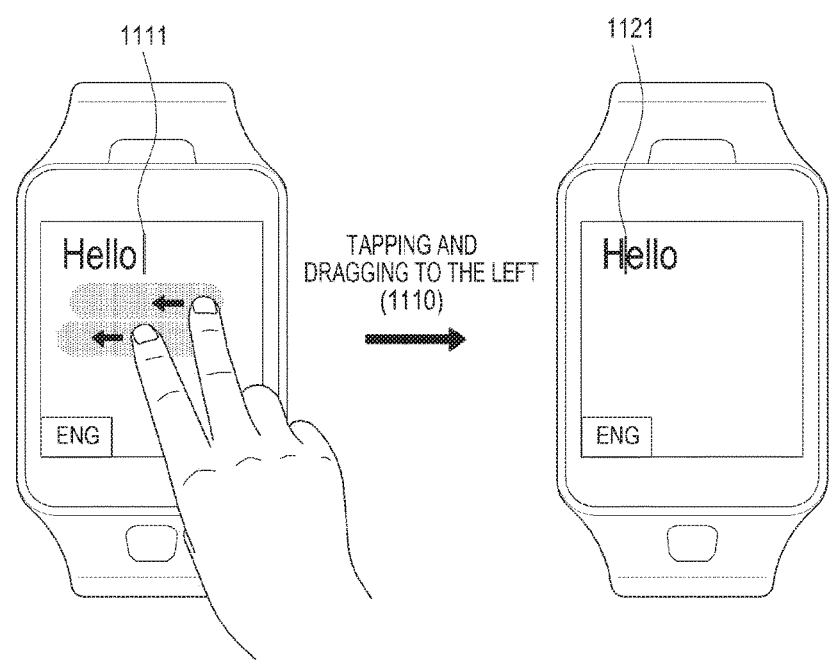
FIG. 11 illustrates processing a text input according to an embodiment of the present invention.

FIG. 11 illustrates processing a text input according to an embodiment of the present invention.

In FIG. 11, the user sets the location of a cursor using gestures after the input of English text (e.g., "Hello") in step 1111.

The user moves the cursor, based on a gesture (e.g., tapping and dragging to the left) using two fingers in step 1110.

For example, when the user performs tapping and dragging to the left four times in step 1110, the electronic device moves the cursor from the current position 1111 (e.g., behind "o") to the position 1121 between "H" and "e".

The user positions the cursor on the location where letters are to be input by the tapping and dragging to the left of step 1110.

Figure 12:
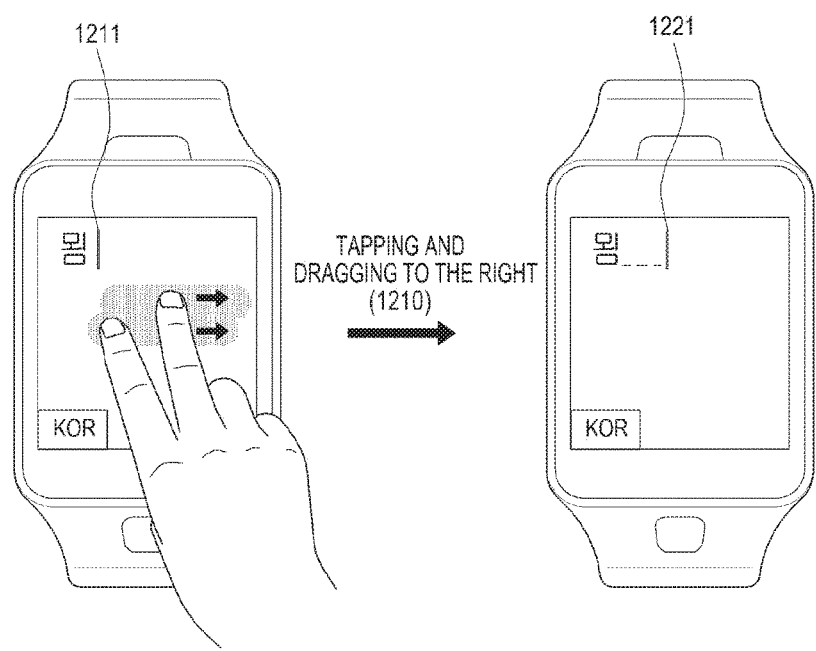
FIG. 12 illustrates processing a text input according to an embodiment of the present invention.

FIG. 12 illustrates processing a text input according to an embodiment of the present invention.

In FIG. 12, the user inserts a space using gestures after the input of Korean text (e.g., "혓").

Referring to FIG. 12, the user inserts a space, based on a gesture (e.g., tapping and dragging to the right) in step 1210 using two fingers. For example, when the user performs the tapping and dragging to the right three times in step 1210, the electronic device inserts three spaces and move the cursor from the current position 1211 to the position 1221 behind the three spaces.

The user inserts a space according to the tapping and dragging to the right of step 1210.

Figure 13:
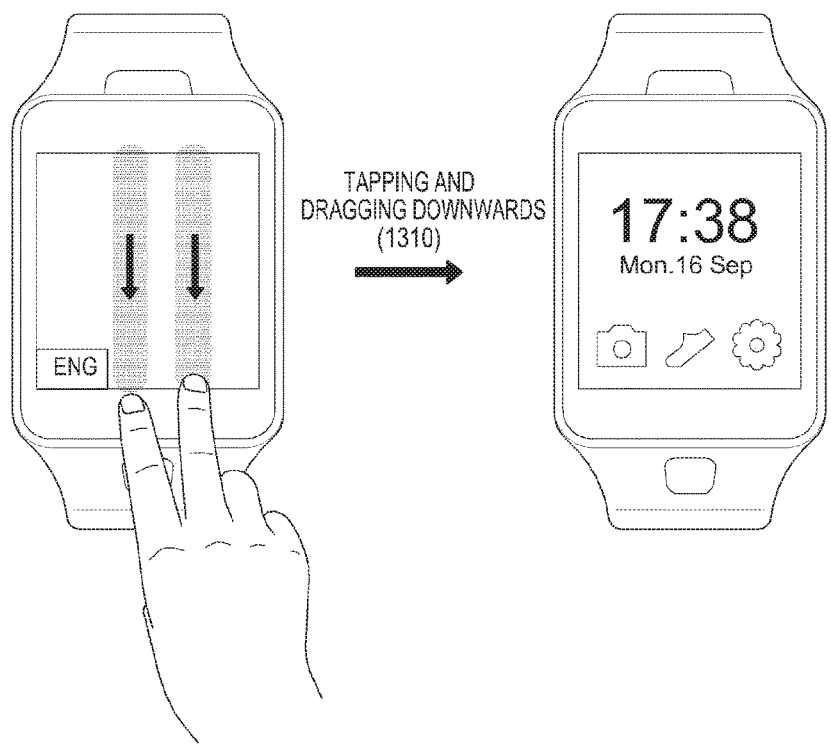
FIG. 13 illustrates processing a text input according to an embodiment of the present invention.

FIG. 13 illustrates processing a text input according to an embodiment of the present invention.

The electronic device to which various embodiments of the present invention can be applied, closes a screen image for the text input and displays a background image when a predetermined gesture is input.

Referring to FIG. 13, the electronic device closes a screen image for the text input and displays a background image, based on a gesture (e.g., tapping and dragging downwards) in step 1310, using two fingers.

According to an embodiment of the present invention, moving a cursor, deleting input text, inserting a space, or closing a text input screen image and displaying a background image may be configured by user's gestures, such as touching using two fingers (e.g., double touch) and then dragging in a predetermined direction.

Figure 14:
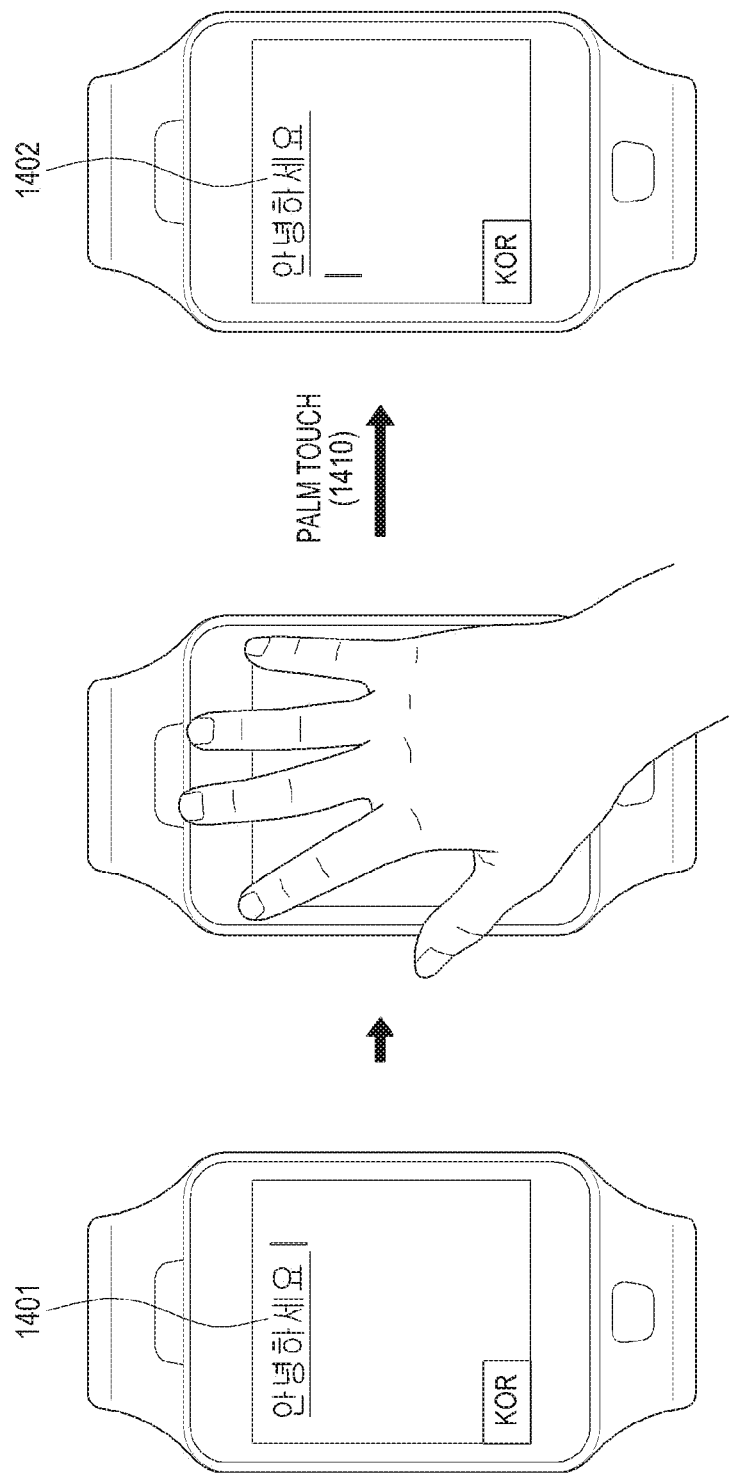
FIG. 14 illustrates processing a text input according to an embodiment of the present invention.

FIG. 14 illustrates processing a text input according to an embodiment of the present invention.

In FIG. 14, when a predetermined gesture is input, the completion of the text input may be identified.

When the user inputs text (e.g., "안녕하세요") into the electronic device and then touches the electronic device by a palm in step 1410, the electronic device determines that the text input is complete, and moves the cursor to the next paragraph as shown in 1402, or inserts special characters (e.g., period or space) behind the text. Alternatively, the electronic device terminates the text input operation.

Figure 15:
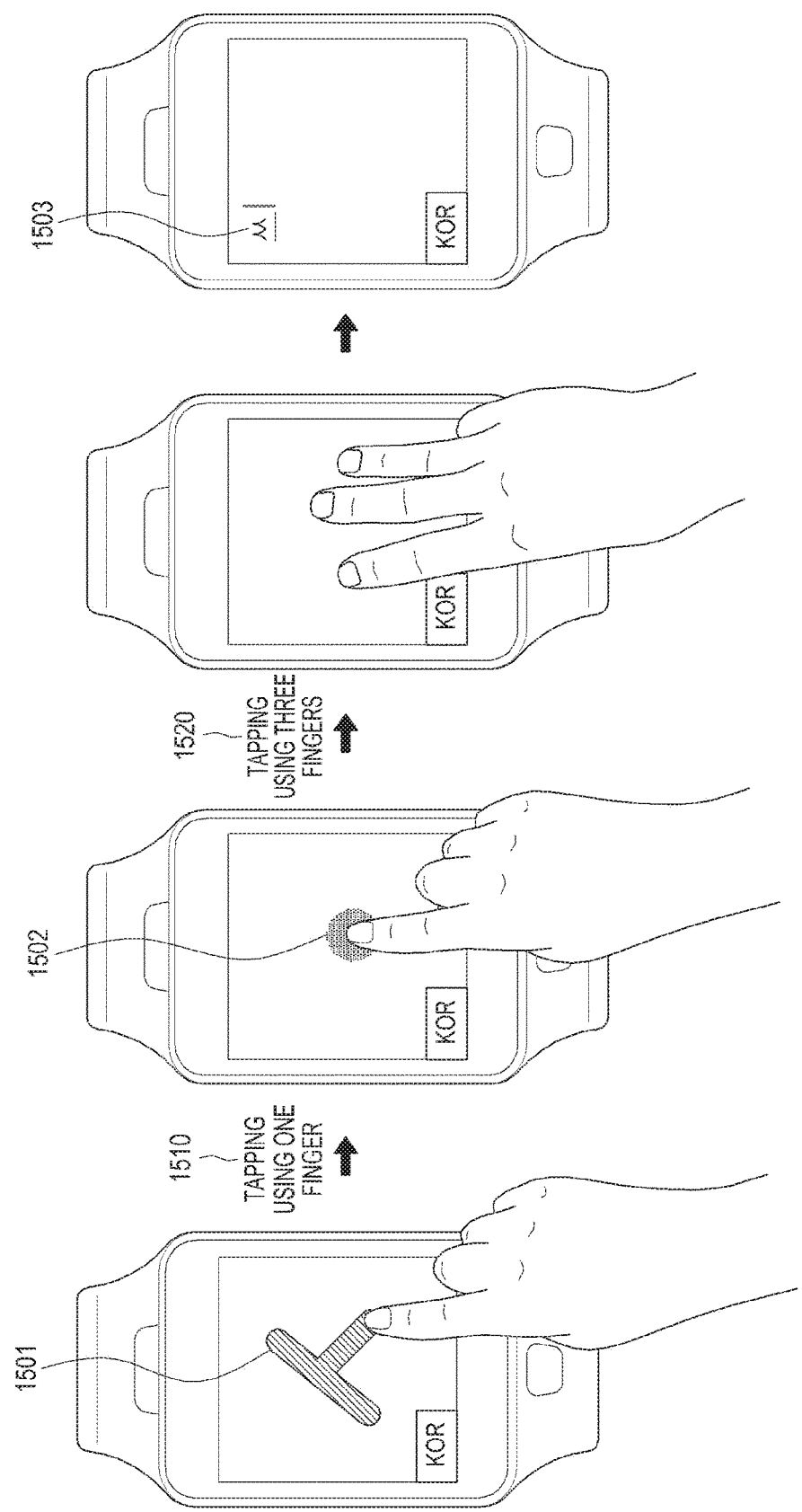
FIG. 15 illustrates processing a text input according to an embodiment of the present invention.

FIG. 15 illustrates processing a text input according to an embodiment of the present invention.

In FIG. 15, when a combination of predetermined gestures is input, the electronic device inputs a double-consonant of the previously input consonant in Korean.

As shown in item 1501, the user inputs a shape of a Korean consonant (e.g., "ㅅ"). Afterwards, the user inputs a point 1502 corresponding to a tap input, and then inputs a tap using three fingers as shown in step 1520.

When the tap input is received in step 1510 after the text input, the electronic device changes a consonant into a double-consonant, a double-consonant into a consonant, a small letter into a capital letter, or a capital letter into a small letter. For example, when a tap input in step 1510 using a single finger is identified after an input of a Korean consonant (e.g., "ㅅ") 1501, the electronic device changes the Korean consonant (e.g., "ㅅ") 1501 that has been previously input into a double-consonant (e.g., "ㅆ") 1503, and inputs the same. Alternatively, when the tap input using a single finger is received in step 1510 after an input of the alphabetic small letter "a", the electronic device changes the small letter "a" into the capital letter "A".

Figure 16:
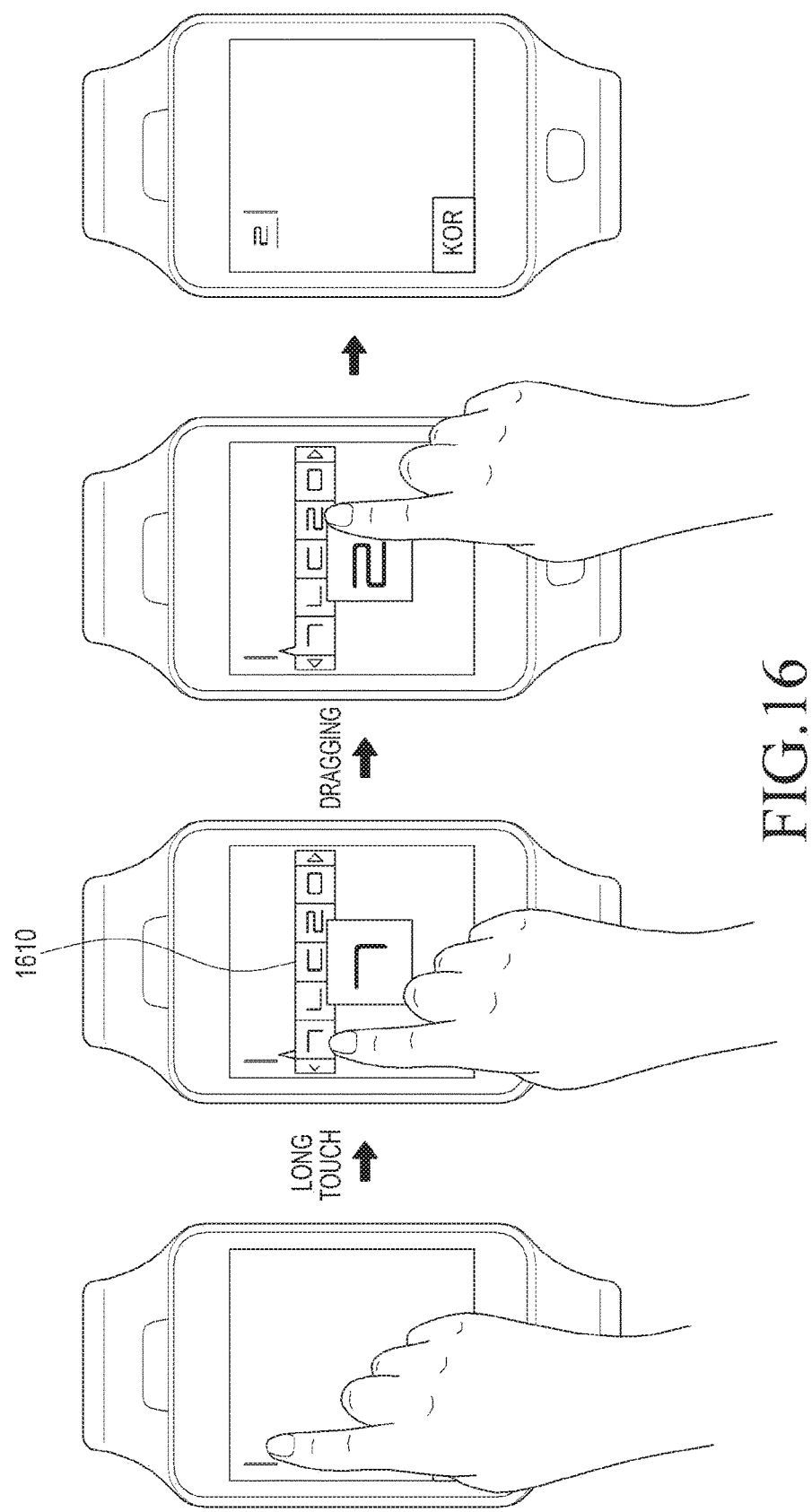
FIG. 16 illustrates processing a text input according to an embodiment of the present invention.

FIG. 16 illustrates processing a text input according to an embodiment of the present invention. Referring to FIG. 16, the electronic device inputs text by a touch & drag input.

When an input (e.g., long touch) for executing the text input mode is detected, the electronic device displays a selection item 1610 for selecting letters. For example, the user may select at least one letter included in the selection item 1610 by dragging with the touch input maintained. The selection item 1610 includes consonants and vowels when an input language is configured as Korean.

When the electronic device detects release of the drag input from item corresponding to at least one consonant (e.g., "ㄹ") or at least one vowel, the electronic device may display the letter corresponding to item (e.g., "ㄹ") where the drag input has been released.

The number or sizes of the consonants or the vowels of the selection item 1610 may vary according to the size of the display screen. For example, when a small screen of the electronic device on which entire consonants and vowels cannot be displayed, the selection item 1610 may further include an arrow.

When the electronic device detects a touch input on the selection item 1610, the selection item 1610 may magnify and display the item corresponding to a specific consonant or a specific vowel that is touched. For example, when the drag input is detected on the selection item 1610, the electronic device may magnify and display the item corresponding to the letter at which the drag input remains.

Figure 17:
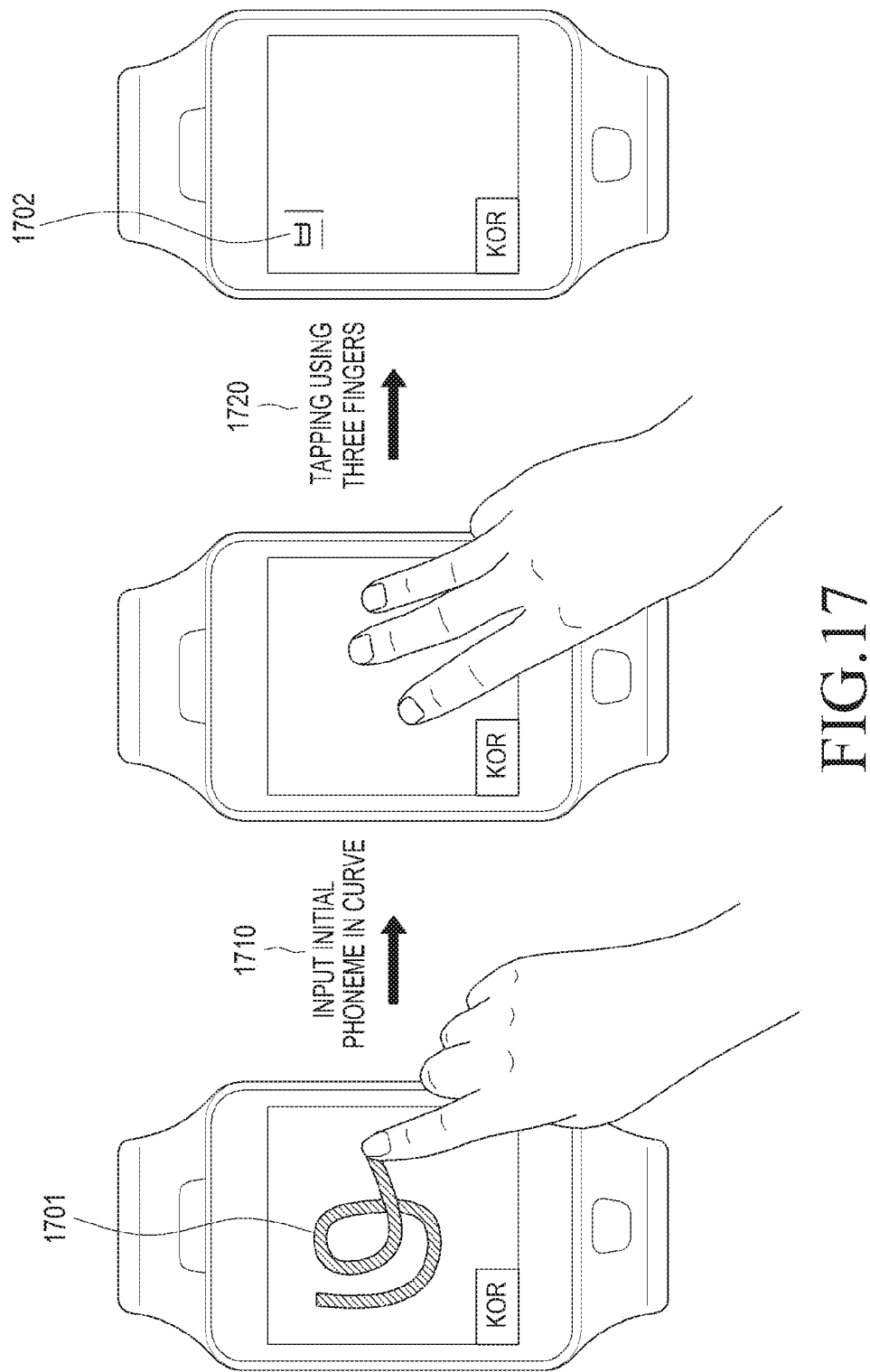
FIG. 17 illustrates processing a text input according to an embodiment of the present invention.

FIG. 17 illustrates processing a text input according to an embodiment of the present invention.

In FIG. 17, when a touch input in the form of a curve using a single finger is detected in a Korean input mode, the electronic device inputs a consonant that is most similar to the curve.

Referring to FIG. 17, the user inputs a curve 1701 into the electronic device. The electronic device inputs a letter (e.g., initial phoneme) by the curve input in the Korean input mode in step 1710, such as by determining a letter corresponding to the shape of the curve, and temporarily storing information related to the determined letter.

When a tap input using three fingers is detected in step 1720 after the text input in the form of a curve, the electronic device controls to display a letter corresponding to the curve through the display. For example, the electronic device determines that the curve is similar to the shape of the Korean letter "ㅂ", and displays "ㅂ" 1702 though the display upon detection of the tap input using three fingers.

Figure 18:
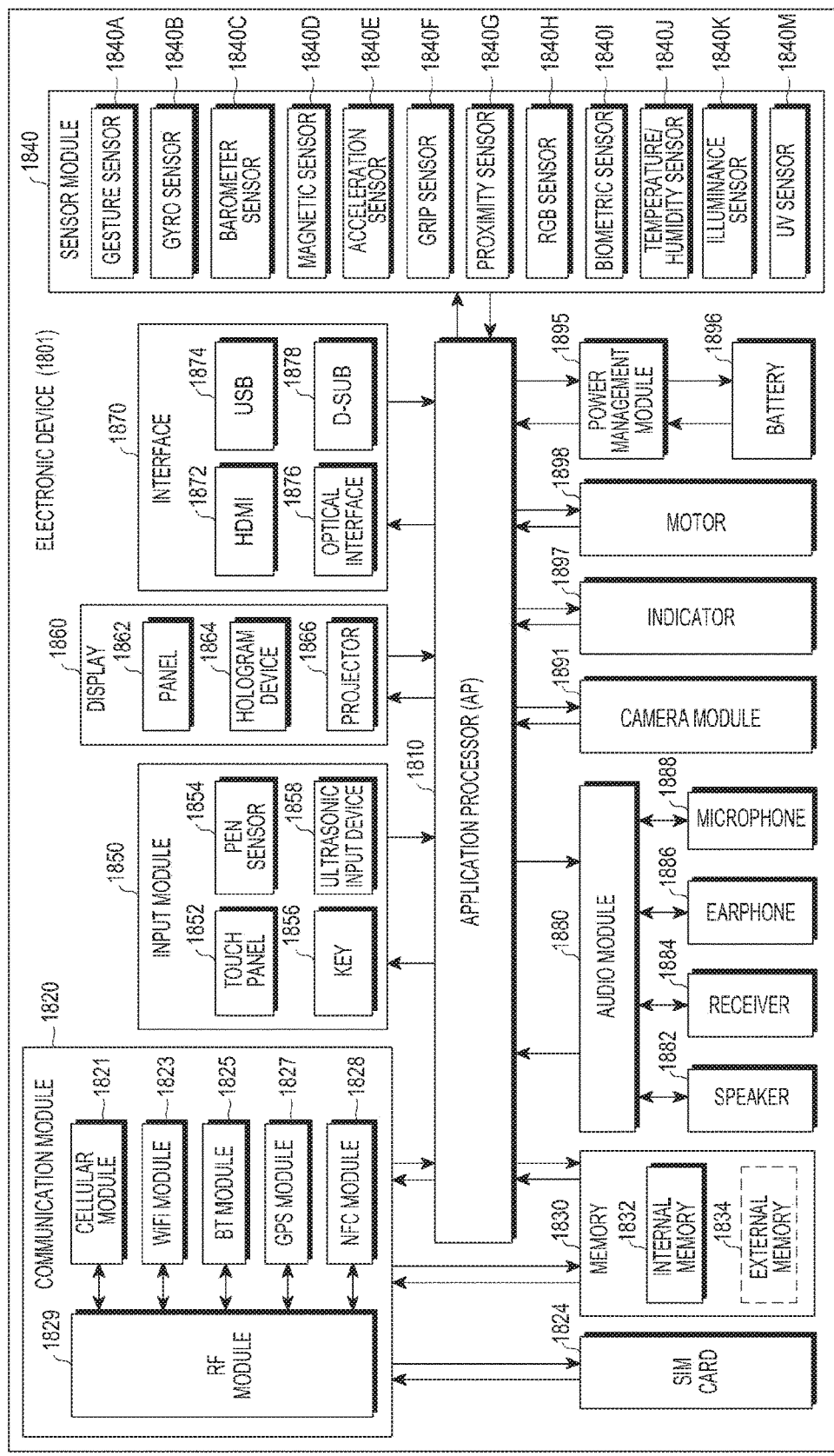
FIG. 18 is a block diagram of an electronic device according to an embodiment of the present invention.

FIG. 18 is a block diagram of an electronic device according to an embodiment of the present invention. The electronic device 1801 may constitute a part of or all of the electronic device 101 shown in FIG. 1. Referring to FIG. 18, the electronic device 1801 includes at least one application processor (AP) 1810, a processor 120 (see FIG. 1), a communication module 1818, a Subscriber Identification Module (SIM) card 1824, a memory 1830, a sensor module 1840, an input device 1850, a display 1860, an interface 1870, an audio module 1880, a camera module 1891, a power management module 1895, a battery 1896, an indicator 1897, and a motor 1898.

The AP 1810 controls hardware or software elements connected with the AP 1810 and performs processing of various pieces of data including multimedia data and calculation by performing an operating system or application programs. The AP 1810 may be implemented by, for example, a System on Chip (SoC), and may further include a Graphic Processing Unit (GPU).

According to an embodiment of the present invention, the AP 1810 controls functions related to the text input. For example, the AP 1810 determines the type of gesture or the number of gestures, which are input through the display 1860. The AP 1810 controls the electronic device (e.g., electronic device 1801 or electronic device 101) to perform functions related to the text input according to the number of fingers that input the gesture.

When a gesture is input, the AP 1810 identifies the type of input gesture. The identified type of gesture may be temporarily stored in the memory 1830, and the letter corresponding to the type may be displayed on the display (e.g., display 1860) according to another gesture that is input at a later time.

When a touch input using three fingers is identified, the AP 1810 controls the display to display a letter (e.g., consonant or vowel in Korean, or alphabet in English) corresponding to the input gesture.

A text input image displayed on the display 1860 includes a selection item for selecting a text input mode. The text input mode may be preset as a default or may be configured by a user. For example, various types of languages or letters such as Korean, English, signs, or numbers, may be selected in the text input mode.

The communication module 1818 (e.g., communication interface 160) performs transmission and reception of data between the electronic device 1801 (e.g., electronic device 101) and other electronic devices (e.g., electronic device 104 or server 106) connected with the electronic device 1801 through networks. The communication module 1818 includes a cellular module 1821, a Wi-Fi module 1823, a BT module 1825, a GPS module 1827, an NFC module 1828, and a radio frequency module 1829.

The cellular module 1821 provides services of voice calls, video calls, text messages, or Internet services through known communication networks. For example, the cellular module 1821 performs identification and authentication of electronic devices in communication networks, using subscriber identification modules (e.g., SIM cards 1824). According to an embodiment of the present invention, the cellular module 1821 performs at least some of functions provided by the AP 1810, such as multimedia control functions.

According to an embodiment of the present invention, the cellular module 1821 includes a Communication Processor (CP). In addition, the cellular module 1821 may be implemented by, for example, an SoC. Although elements such as the cellular module 1821 (e.g., communication processor), the memory 1830, or the power management module 1895 are illustrated to be separate from the AP 1810 in FIG. 18, according to an embodiment of the present invention, the AP

1810 may include at least some (e.g., cellular module 1821) of the above-described elements.

The AP 1810 or the cellular module 1821 (e.g., communication processor) may load instructions or data received from at least one of non-volatile memories or other elements, which are connected with the AP 1810 or the cellular module 1821 in volatile memories, and process the same. The AP 1810 or the cellular module 1821 may store data that is received or generated from or by at least one of the elements in non-volatile memories.

Each of the Wi-Fi module 1823, the BT module 1825, the GPS module 1827, or the NFC module 1828, for example, includes a processor for processing data transmitted and received through each module. Although the cellular module 1821, the Wi-Fi module 1823, the BT module 1825, the GPS module 1827, or the NFC module 1828 are illustrated as separated blocks in FIG. 18, according to an embodiment of the present invention, at least some (e.g., two or more) of the cellular module 1821, the Wi-Fi module 1823, the BT module 1825, the GPS module 1827, or the NFC module 1828 may be included in a single Integrated Chip (IC) or one IC package. For example, at least some processors (e.g., communication processor corresponding to cellular module 1821, or Wi-Fi processor corresponding to Wi-Fi module 1823) corresponding to the cellular module 1821, the Wi-Fi module 1823, the BT module 1825, the GPS module 1827, and the NFC module 1828 may be implemented by a single SoC.

The RF module 1829 transmits and receives data, for example, RF signals. The RF module 1829, although not shown, includes, for example, transceivers, Power Amp Modules (PAM), frequency filters, and Low Noise Amplifiers (LNA). The RF module 1829 may further include components such as conductors or cables for transmitting and receiving electromagnetic waves through free space in wireless communication. Although the cellular module 1821, the Wi-Fi module 1823, the BT module 1825, the GPS module 1827, and the NFC module 1828 share one RF module 1829 in FIG. 18, according to an embodiment of the present invention, at least one of the cellular module 1821, the Wi-Fi module 1823, the BT module 1825, the GPS module 1827, and the NFC module 1828 may transmit and receive RF signals through separate modules.

The SIM card 1824 may adopt a subscriber identification module, and be inserted into a slot formed at a predetermined position of the electronic device. The SIM card 1824 includes an inherent identification information (e.g., IC Card IDentifier (ICCID)) or subscriber information (e.g., International Mobile Subscriber Identity (IMSI)).

The memory 1830 (e.g., memory 130) includes an internal memory 1832, and optionally an external memory 1834. The internal memory 1832 includes at least one of volatile memories (e.g., Dynamic RAM (DRAM), static RAM (SRAM), Synchronous Dynamic RAM (SDRAM)) or non-volatile Memories (e.g., One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, and NOR flash memory).

According to an embodiment, the internal memory 1832 may be a Solid-State Drive (SSD). The external memory 1834 may further include a flash drive, for example, a Compact Flash (CF), a Secure Digital (SD), a Micro SD, a Mini SD, an extreme Digital (xD), or a memory stick. The external memory 1834 may be functionally connected with the electronic device 1801 through various interfaces, and the electronic device 1801 may further include a storage device (or storage medium) such as a hard drive.

The sensor module 1840 measures physical quantities and detect an operation state of the electronic device, to thereby convert the measured or detected information to electric signals. The sensor module 1840 includes, for example, a gesture sensor 1840A, a gyro-sensor 1840B, an atmospheric sensor 1840C, a magnetic sensor 1840D, an acceleration sensor 1840E, a grip sensor 1840F, a proximity sensor 1840G, a color sensor 1840H (e.g., Red-Green-Blue (RGB) sensor), a bio sensor 1840I, a temperature/humidity sensor 1840J, an illuminance sensor 1840K, and an Ultra Violet (UV) sensor 1840M. Alternatively or additionally, the sensor module 1840 may further include at least one of an E-nose sensor, an Electromyography sensor (EMG), an Electroencephalogram sensor (EEG), an Electrocardiogram sensor (ECG), an Infrared (IR) sensor, an iris sensor, and a fingerprint sensor. The sensor module 1840 may further include a control circuit for controlling at least one sensor included in the sensor module 1840.

The input device 1850 includes a touch panel 1852, a (digital) pen sensor 1854, keys 1856, or an ultrasonic input device 1858. The touch panel 1852 recognizes a touch input by at least one of for example, a capacitive type, a pressure type, an infrared type, or an ultrasonic type. In addition, the touch panel 1852 may further include a control circuit. When the capacitive type is used, the proximity and direct touches may be detected together. The touch panel 1852 may further include a tactile layer. In this case, the touch panel 1852 provides a user with a tactile reaction.

The (digital) pen sensor 1854 may be implemented, for example, by a method that is the same as or similar to the user's touch input, or by a separate recognition sheet. The keys 1856 includes, for example, physical buttons, optical keys, or a keypad. The ultrasonic input device 1858 detects acoustic waves with a microphone (e.g., microphone 1888) at the electronic device 1801 through an input means that generates ultrasonic signals to thereby identify data. The ultrasonic input device 1858 performs wireless recognition. According to an embodiment, the electronic device 1801 receives a user input from external devices (e.g., computers, or servers) which are connected with the communication module 1818 by using the communication module 1818.

The display 1860 (e.g., display 150) includes a panel 1862, a hologram device 1864, and a projector 1866. The panel 1862 may be, for example, a Liquid Crystal Display (LCD), and an Active-Matrix Organic Light-Emitting Diode (AM-OLED). The panel 1862 may be implemented to be, for example, flexible, transparent and/or wearable. The panel 1862 may be configured with the touch panel 1852 as a single module. The hologram device 1864 displays 3D images in the air by using interference of light. The projector 1866 displays images by projecting light onto a screen. The screen may be positioned, for example, inside or outside the electronic device 1801. The display 1860 may further include a control circuit for controlling the panel 1862, the hologram device 1864, or the projector 1866.

According to an embodiment of the present invention, the display 1860 may be a touch screen that detects touch inputs such as by at least one finger through at least one sensor (e.g., sensor module 1840) or the input device 1850.

The interface 1870 includes, for example, a High-Definition Multimedia Interface (HDMI) 1872, a Universal Serial Bus (UBS) 1874, an optical interface 1876, or a D-subminiature (D-sub) 1878. The interface 1870, for example, may be included in the communication interface 160 shown in FIG. 1. Additionally or alternatively, the interface 1870 includes, for example, a Mobile High-definition Link (MHL) interface, a Secure Digital (SD) card/Multi-Media Card (MMC) interface or an Infrared Data Association (IrDA) standard interface.

The audio module 1880 converts voices into electric signals, and vice versa. At least some elements of the audio module 1880, for example, may be included in the input/output interface 140 shown in FIG. 1. The audio module 1880 processes voice information input or output through, for example, a speaker 1882, a receiver 1884, earphones 1886, or a microphone 1888.

The camera module 1891 is a device for photographing still and moving images, and though not shown, may include at least one image sensor (e.g., front sensor or rear sensor), lenses, an Image Signal Processor (ISP), and a flash (e.g., LED or xenon lamp).

The power control module 1895 manages power of the electronic device 1801. Although not shown, the power management module 1895 may include a Power Management Integrated Circuit (PMIC), a charger IC, and a battery gauge.

The PMIC may be mounted, for example, in integrated circuits or SoC semiconductors. The charging methods may be divided into a wired type and a wireless type. The charger IC charges a battery and prevents inflow of excessive voltage or excessive current from a charger. According to an embodiment, the charger IC includes a charger IC for at least one of the wired charging type or the wireless charging type. The wireless charging type may encompass, for example, a magnetic resonance type, a magnetic induction type or an electromagnetic wave type, and additional circuits for wireless charging such as coil loops, resonance circuits, rectifiers may be added.

The battery gauge measures, for example, the remaining amount of battery 1896, a charging voltage and current, and temperature. The battery 1896 stores or generates electric power, and supplies electric power to the electronic device 1801 by using the stored or generated power. The battery 1896 may be, for example, a rechargeable battery or a solar battery.

The indicator 1897 displays a specific state, for example, a booting state, a message state or a charging state of the entire or a part (e.g., AP 1810) of the electronic device 1801. The motor 1898 converts electric signals to mechanical vibration. Although not shown, the electronic device 1801 may further include a processing device (e.g., GPU) for supporting mobile TV, which processes media data according to standards such as, for example, Digital Multimedia Broadcasting (DMB), Digital Video Broadcasting (DVB) or media flow.

Figure 19:
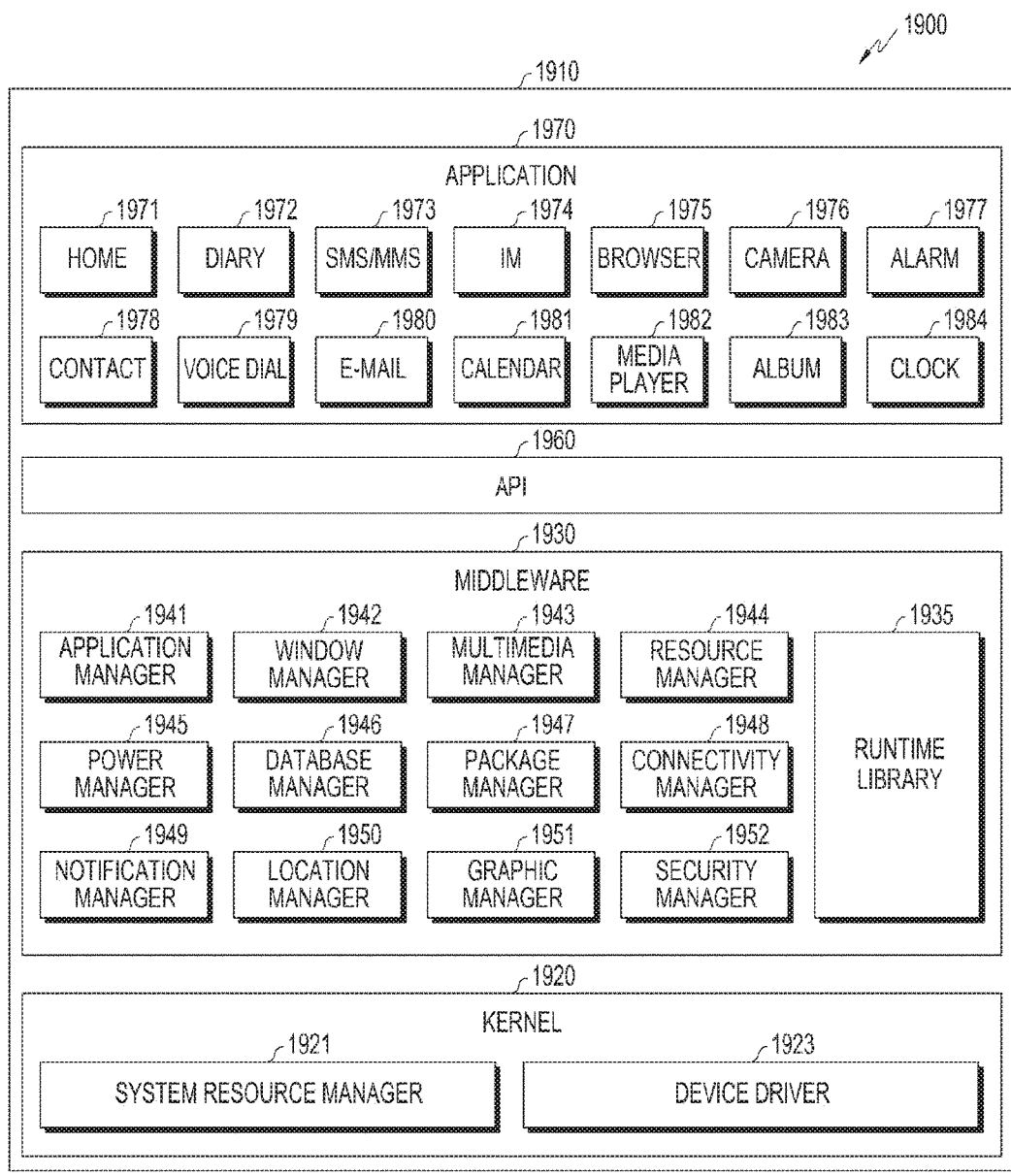
FIG. 19 is a block diagram of a program module according to an embodiment of the present invention.

FIG. 19 is a block diagram of a program module according to an embodiment of the present invention. The program module 1910 (e.g., programs 140) includes an Operating System (OS) that controls resources related to an electronic apparatus (e.g., electronic device 101), or various applications (e.g., applications 134) which are executed under the OS. The OS may be, for example, Android, iOS, Windows, Symbian, Tizen, or Bada.

Referring to FIG. 19, the program module 1910 includes a kernel 1920, a middleware 1930, an Application Programming Interface (API) 1960, and/or applications 1970. At least some of the program module 1910 may be pre-loaded in the electronic device, or may be downloaded from a server (e.g., server 106).

A kernel 1920 (e.g., kernel 131 of FIG. 1) includes a system resource manger 1921 and a device driver 1923. The system resource manager 1921 performs control, allotment, or collection of system resources. Although not shown, the system resource manager 1921 may include a process managing unit, a memory managing unit, or a file system managing unit, and the device driver 1923 may include a display driver, a camera driver, a Bluetooth™ driver, a shared memory driver, a USB driver, a keypad driver, a Wi-Fi driver, an audio driver, or Inter-Process Communication (IPC) driver.

The middleware 1930, for example, provides common functions necessary for the applications 1970, or provides various functions to the applications 1970 through the API 1960 in order to effectively use limited system resources inside the electronic device for the applications 1970. According In FIG. 19, the middleware 1930 (e.g., middleware 132) includes a run-time library 1935, an application manager 1941, a window manager 1942, a multimedia manager 1943, a resource manager 1944, a power manager 1945, a database manager 1946, a package manager 1947, a connectivity manager 1948, a notification manager 1949, a location manager 1950, a graphic manager 1951, and a security manager 1952.

Although not shown, the run-time library 1935 may include a library module that a compiler uses to add new functions through a programming language during execution of applications 1970. The run-time library 1935 performs functions of an input/output, management of memories, or calculation of a formula.

The application manager 1941 manages a life cycle of at least one of the applications 1970. The window manager 1942 manages a GUI resource used in a screen. The multimedia manager 1943 recognizes a format necessary for reproduction of various media files, and performs encoding or decoding of the media files using a codec corresponding to the format. The resource manager 1944 manages resources such as a source code of at least one of the applications 1970, memories, or storages.

The power manager 1945 manages a battery or a power source in cooperation with a Basic Input/Output System (BIOS), and provide power information required for operating the electronic device. The database manager 1946 manages generating, searching or changing of a database used in at least one of the applications 1970. The package manager 1947 manages installation or update of the application distributed in the form of a package file.

The connectivity manager 1948 manages a wireless connection of, for example, Wi-Fi or Bluetooth™. The notification manager 1949 displays or notifies events such as received massages, appointments, and proximity notifications in a manner that does not disturb a user. The location manager 1950 manages location information of the electronic device. The graphic manager 1951 manages a graphic effect to be provided to a user and interfaces related thereto. The security manager 1952 provides general security functions required for system security or user authentication. When an electronic device (e.g., electronic device 101) adopts a phone call function, the middleware 1930 may further include a telephone manager to manage a voice or video phone call function of the electronic device.

The middleware 1930 includes a middleware module that is formed by a combination of various functions of the above-described elements. The middleware 1930 provides modules which are specialized according to the type of operating system in order to provide differentiated functions. In addition, the middleware 1930 may dynamically remove some typical elements or add new elements.

The API 1960 (e.g., API 133), which is a group of API programming functions, may be provided with a different configuration according to operating systems. For example, when using Android or iOS, for example, one set of APIs may be provided to each flat-form. When using Tizen, for example, two or more sets of APIs may be provided.

The applications 1970 (e.g., applications 134) include home 1971, a dialer 1972, an SMS/MMS 1973, an Instant Message (IM) 1974, a browser 1975, a camera 1976, an alarm 1977, contact 1978, a voice dial 1979, e-mail 1980, a calendar 1981, a media player 1982, an album 1983, a clock 1984, health care (e.g., measuring amount of exercise or blood sugar), and environmental information provision (e.g., providing atmospheric pressure, humidity, or temperature) applications.

According to an embodiment of the present invention, the applications 1970 may include an application related to the exchange of information (hereinafter, referred to as an information exchange application) between the electronic device (e.g., electronic device 101) and external electronic devices (e.g., electronic device 104). The information exchange application includes, for example, a notification relay application for relaying specific information to the external electronic device, or a device management application for managing the external electronic device.

For example, the notification relay application includes a function of transferring notification information created in other applications (e.g., SMS/MMS application, e-mail application, health care application, environmental information application) of the electronic device to external electronic device 104. In addition, the notification relay application receives notification information from an external electronic device to thereby provide the same to a user. The device management application manages (e.g., installs, deletes, or updates), for example, at least some functions (e.g., turning external electronic device (or some elements) on or off, or adjusts the brightness (or resolution) of a display) of external electronic device 104 that communicate with the electronic device, applications executed in the external electronic devices, or services (e.g., phone call services, or messaging services) provided in the external electronic devices.

The applications 1970 may include applications, which are designated according to the properties (e.g., the type of electronic device) of the external electronic device (e.g., electronic device 104, as well as applications received from the external electronic devices (e.g., server 106 or electronic device 104). The applications 1970 may further include preloaded applications or third party applications that can be downloaded from the server. Names of elements of the program module 1910 may vary with operating systems.

At least a part of the programming modules 1910 may be configured with software, firmware, hardware, or a combination of at least two of software, firmware, and hardware. At least a part of the programming modules 1910 may be implemented (for example, performed) by, for example, the processor 2010. At least some of the programming module 1910 may include, for example, a module, a program, a routine, sets of instructions, or a process for performing one or more functions.

Each of the above described elements of the electronic device according to the present invention may be formed of one or more components, and the name of a corresponding element may vary according to the type of an electronic device. The electronic device may be formed to include at least one of the above described components, and some of the components may be omitted or additional components may be further included. Further, some of the elements of the electronic device according to an embodiment of the present invention may be coupled to form a single entity while performing the same functions as those of the corresponding elements before the coupling.

The term "module" used in describing the various embodiments of the present invention may refer to, for example, a unit including one or more combinations of hardware, software, and firmware. The "module" may be interchangeable with a term, such as a unit, a logic, a logical block, a component, or a circuit. The "module" may be the smallest unit of an integrated component or a part thereof. The "module" may be a minimum unit for performing one or more functions or a part thereof. The "module" may be mechanically or electronically implemented. For example, the "module" according to an embodiment of the present invention includes at least one of an Application-Specific IC (ASIC) chip, a Field-Programmable Gate Array (FPGA), and a programmable-logic device for performing functions that are now known or will be developed in the future.

At least some of the devices (e.g., modules or functions thereof) or methods (e.g., operations) according to an embodiment of the present invention may be implemented by, for example, by a command stored in a computer-readable storage medium in the form of a programming module. When the instruction is performed by at least one processor (for example, the processor 120), the at least one processor may perform a function corresponding to the instruction. The computer-readable storage medium may be, for example, the memory 130. At least some of the programming modules may be implemented (for example, executed) by, for example, the processor 120. At least a part of the programming module may include, for example, a module, a program, a routine, a set of instructions and/or a process for performing one or more functions.

The computer readable recording medium may include magnetic media such as a hard disc, a floppy disc, and a magnetic tape, optical media such as a Compact Disc Read Only Memory (CD-ROM) and a Digital Versatile Disc (DVD), magneto-optical media such as a floptical disk, and hardware devices specifically configured to store and execute program commands, such as a Read Only Memory (ROM), a Random Access Memory (RAM), and a flash memory. In addition, the program instructions includes high class language codes, which can be executed in a computer by using an interpreter, as well as machine codes made by a compiler. Any of the hardware devices as described above may be configured to work as one or more software modules in order to perform functions disclosed in the present invention, and vice versa.

Any of the modules or programming modules according to an embodiment of the present invention may include at least one of the above described elements, exclude some of the elements, or further include other additional elements. Functions performed by the modules, programming module, or other elements according to the present invention may be executed in a sequential, parallel, repetitive, or heuristic manner. Further, some operations may be executed according to another order or may be omitted, or other operations may be added.

According to an embodiment of the present invention, a recording medium stores instructions that are executed by at least one processor to allow the processor to at least one operation, such as detecting at least one touch input, determining the number of fingers that have touched from the detected touch input, and controlling functions related to a text input, based on the determination.

Various embodiments of the present invention disclosed in this specification and the drawings are merely specific examples presented in order to easily describe technical details of the present invention and to help the understanding of the present invention, and are not intended to limit the scope of the present invention. Therefore, it should be construed that, in addition to the embodiments disclosed herein, all modifications and changes or modified and changed forms derived from the technical idea of various embodiments of the present invention fall within the scope of the present invention.

While one or more embodiments of the present invention have been described with reference to the figures, it will be understood by those of ordinary skill in the art that various changes in form and details may be made therein without departing from the spirit and scope of the present disclosure as defined by the following claims and their equivalents.

What is claimed is:

1. A method for controlling a text input in an electronic device, the method comprising:
   detecting a first touch input;
   determining a total number of touches that have made the first touch input from the detected first touch input;
   in response to determining that the first touch input has been made by three or more fingers, displaying a letter recognized from trajectory of at least one second touch input which is input before the first touch input; and
   in response to determining that the first touch input not has been made by three or more fingers, refraining from displaying the letter recognized from the trajectory of the at least one second touch input which is input before the first touch input.

2. The method of claim 1, further comprising:
   detecting a third touch input;
   determining whether the third touch input has been made by fingers or by a palm, based on the detected third touch input; and
   in response to the third touch input made by the palm, executing a predefined function corresponding to the third touch input by the palm.

3. The method of claim 1, further comprising, in response to the at least one second touch input made by a single finger, identifying the letter recognized from the trajectory of the at least one second touch input by the single finger.

4. The method of claim 1, further comprising:
   detecting at least one third touch input which is made by two fingers; and
   determining a moving direction of the at least one third touch input.

5. The method of claim 4, further comprising, in response to the at least one third touch input made by two fingers, executing a predefined function according to the moving direction of the at least one third touch input by two fingers.

6. The method of claim 5, further comprising, in response to the at least one third touch input by two fingers moving in a left direction, moving a cursor by each letter unit in a text input window according to the number of the at least one third touch input by two fingers.

7. The method of claim 5, further comprising, in response to the at least one third touch input by two fingers moving in a right direction, inserting a space according to the number of the at least one third touch input by two fingers.

8. The method of claim 5, further comprising, in response to the at least one third touch input by two fingers moving in an upward direction, deleting letters that have been previously input according to the number of the at least one third touch input by two fingers.

9. The method of claim 5, further comprising, in response to the at least one third touch input by two fingers moving in a downward direction, closing a text input window.

10. An electronic device comprising:
    a touch screen; and
    a processor that:
    determines a total number of touches that have made a first touch input detected through the first touch screen,
    displays a letter recognized from trajectory of at least one second touch input which is input before the first touch input in response to determining that the first touch input has been made by three or more fingers, and
    in response to determining that the first touch input has not been made by three or more fingers, refrains from displaying the letter recognized from the trajectory of the at least one second touch input which is input before the first touch input.

11. The electronic device of claim 10, wherein the processor further detects a third input, determines whether the third touch input has been made by fingers or by a palm, based on the detected third touch input, and in response to the first touch input made by the palm, executes a predefined function corresponding to the third touch input by the palm.

12. The electronic device of claim 10, wherein if the at least one second touch input has been made by a single finger, the processor further identifies a letter recognized from the trajectory of the at least one second touch input by the single finger.

13. The electronic device of claim 10, wherein the processor further detects at least one third touch input which is made by two fingers, and determines a moving direction of the at least one third touch input.

14. The electronic device of claim 13, wherein, in response to the at least one third touch input made by two fingers, the processor further executes a predefined function according to the moving direction of the at least one third touch input by two fingers.

15. The electronic device of claim 14, wherein, in response to the at least one third touch input by two fingers moves in a left direction, the processor further makes a control to move a cursor by each letter unit in a text input window according to the number of the at least one third touch input by two fingers.

16. The electronic device of claim 14, wherein, in response to the at least one third touch input by two fingers moves in a right direction, the processor further inserts a space according to the number of the at least one third touch input by two fingers.

17. The electronic device of claim 14, wherein, in response to the at least one third touch input by two fingers moves in an upward direction, the processor further deletes letters that have been previously input according to the number of the at least one third touch input by two fingers.

18. The electronic device of claim 14, wherein, in response to the at least one third touch input by two fingers moves in a downward direction, the processor further makes a control to close a text input window.

* * * * *